US012645724B2

(12) United States Patent
Vick et al.

(10) Patent No.: US 12,645,724 B2
(45) Date of Patent: Jun. 2, 2026

(54) AUTOMATED SOLUTION MANAGER

(71) Applicant: Hexagon Technology Center GmbH,
Heerbrugg (CH)

(72) Inventors: Jason Vick, Madison, AL (US); **John
Craighton, Madison, AL (US); George
L. Jackson**, Madison, AL (US)

(73) Assignee: Hexagon Technology Center GmbH,
Heerbrugg (CH)

( * ) Notice: Subject to any disclaimer, the term of this
patent is extended or adjusted under 35
U.S.C. 154(b) by 0 days.

(21) Appl. No.: 18/808,468

(22) Filed: Aug. 19, 2024

(65) Prior Publication Data

US 2025/0139144 A1      May 1, 2025

Related U.S. Application Data

(60) Provisional application No. 63/545,818, filed on Oct.
26, 2023.

(51) Int. Cl.
*G06F 16/00*      (2019.01)
*G06F 16/22*      (2019.01)
*G06F 16/3329*      (2025.01)
*G06F 16/338*      (2019.01)

(52) U.S. Cl.
CPC ........ *G06F 16/338* (2019.01); *G06F 16/2246*
(2019.01); *G06F 16/3329* (2019.01)

(58) Field of Classification Search
CPC . G06F 16/338; G06F 16/2246; G06F 16/3329
USPC ........................................................ 707/722
See application file for complete search history.

(56) References Cited

U.S. PATENT DOCUMENTS

| | | | | |
|---|---|---|---|---|
| 10,031,640 | B2 * | 7/2018 | Hilton | G06F 3/04815 |
| 10,467,261 | B1 * | 11/2019 | Doyle | G06F 16/248 |
| 11,769,521 | B1 | 9/2023 | Pitzer | |
| 2005/0060662 | A1 | 3/2005 | Soares et al. | |
| 2021/0014231 | A1 * | 1/2021 | Durbin | H04W 12/088 |
| 2022/0094688 | A1 * | 3/2022 | Durbin | H04W 12/088 |

OTHER PUBLICATIONS

"Gewirtz David: ""I used ChatGPT to rewrite my text in the style
of Shakespeare, C3PO, and Harry Potter""", Internet Article,Feb. 13,
2023 (Feb. 13, 2023), XP093234494, Retrieved from the Internet:
URL:https://www.zdnet.com/article/i-used-chatgpt-to-rewrite-my-
text-in-the-style-of-shakespeare-c3po-and-harry-potter/ (8 pages)".
International Search Report and Written Opinion of the Interna-
tional Searching Authority for application PCT/US2024/052739,
dated Jan. 23, 2025 (14 pages).
Mendez, A., et al, "How to design a decision tree correctly?",
Internet Article, May 20, 2021 (May 20, 2021), XP093234492,
Retrieved from the Internet: URL:https://stackoverflow.com/questions/
67600399/how-to-design-a- decision-tree-correctly (2 pages).

* cited by examiner

*Primary Examiner* — Monica M Pyo
(74) *Attorney, Agent, or Firm* — Nutter McClennen &
Fish LLP

(57) ABSTRACT

A system is configured to quickly identify relevant solutions
from a complex portfolio of products that each may incor-
porate one or more solutions. This system therefore enables
determination of a customized set of solutions for a particu-
lar end-user or end-user of the solutions.

20 Claims, 28 Drawing Sheets

Figure 7A:
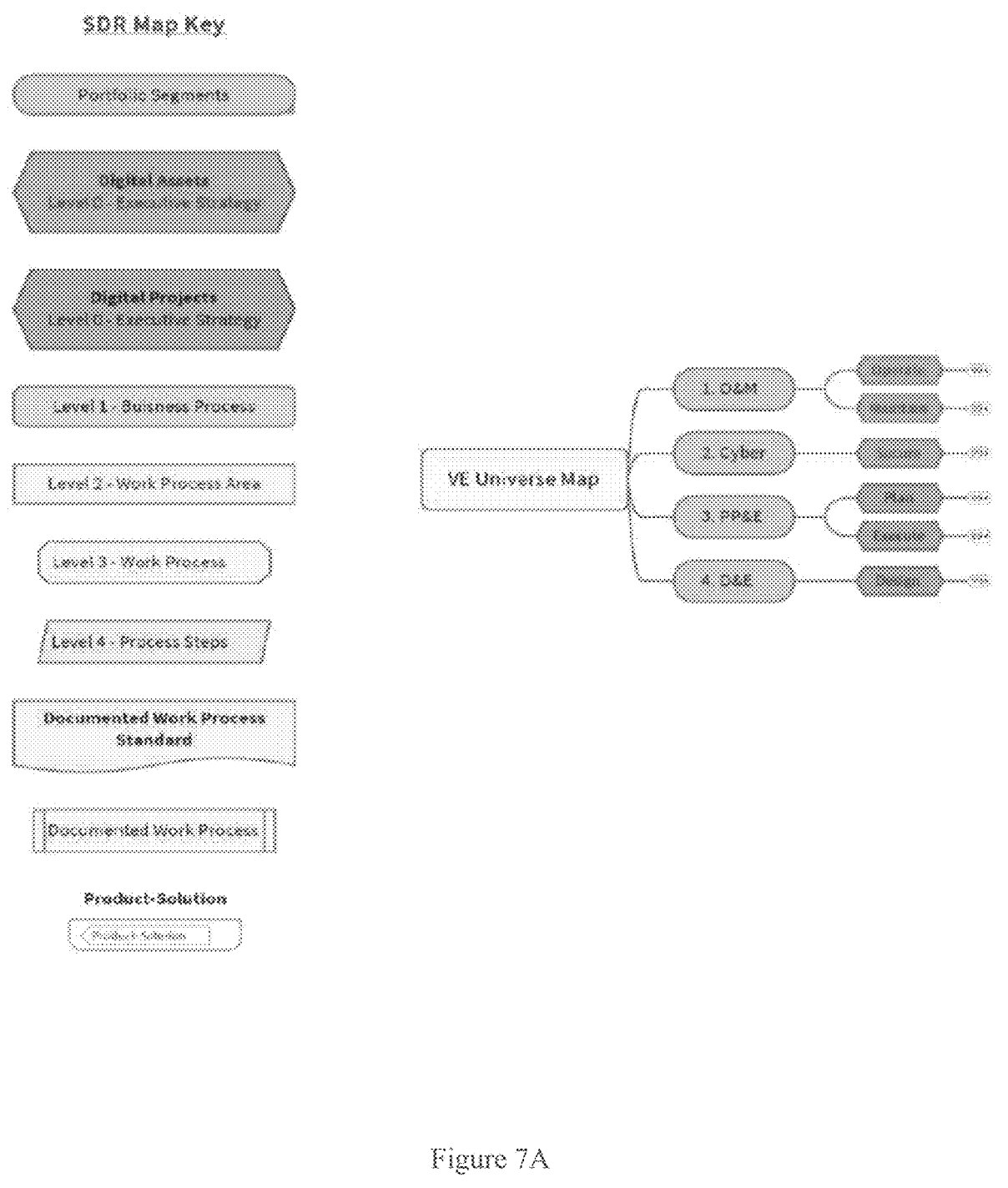

SDR Map Key

Portfolio Segments

Digital Assets
Level 0 - Executive Strategy

Digital Property
Level 0 - Executive Strategy

Level 1 - Business Process

Level 2 - Work Process Area

Level 3 - Work Process

Level 4 - Process Steps

Documented Work Process
Standard

Documented Work Process

Product-Solution

Product Solution

VE Universe Map

1. Data

2. Cyber

3. HVAC

AUTOMATED SOLUTION MANAGER

RELATED APPLICATIONS

This application claims priority to U.S. Provisional Application No. 63/545,818, filed Oct. 26, 2023 and titled "Automated Solution Manager" and naming Jason Vick and John Craighton as inventors.

The disclosure of each of the foregoing is incorporated herein by reference, in its entirety.

FIELD

Illustrative embodiments of the invention generally relate to solution management systems and, more particularly, various embodiments of the invention relate to platforms to effectively direct users toward an appropriate solution.

BACKGROUND

Many companies have a large complex suite of solutions that span the entire lifecycle of a large-scale asset from design, construction, operations, maintenance, cyber security and physical security, and decommissioning. These products may be sold into almost any one of dozens or hundreds of relevant industry subsectors. The sheer complexity presents significant obstacles for stakeholders to identify relevant products that could be implemented based on end-user goals, strategies, and challenges.

SUMMARY OF VARIOUS EMBODIMENTS

In accordance with one embodiment of the invention, a computer-implemented method of managing a plurality of software solutions, each software solution useful for constructing or operating a large-scale industrial facility, includes:

providing, to a computer, a solution database defining a plurality of distinct software-implemented solutions;

providing, to the computer, a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

generating, on a display device in communication with the computer, a graphical user interface producing a dynamic sequence of questions as a function of both the data model and answers to questions received from the user, said answers including user input, the sequence of questions configured to solicit from the user information about challenges relating to constructing or operating said large-scale industrial facility, the sequence of questions including:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question; and causing an automated report builder to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

In some embodiments of the method, causing an automated report builder to produce an output report includes automatically causing the automated report builder to produce the report after completing the sequence of questions.

In some embodiments of the method, causing an automated report builder to produce an output report occurs in response to receipt by the computer of a request to produce the output report.

In some embodiments of the method, the solution database is indexed as a function of tools and solutions within the tools, each tool having tool information stored in the solution database, each tool having one or more solutions from the plurality of distinct software-implemented solutions.

In some embodiments of the method, each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

In some embodiments of the method, the graphical user interface automatically displays previously un-displayed sequential subsequent question after receiving an answer to a displayed predecessor question.

In some embodiments of the method, providing a computer-implemented artificial intelligence, said artificial intelligence configured to:

accept a vector defined by the answers to the sequence of questions; and to produce, from said vector, the output report that includes the set of specified solutions.

In some such embodiments, the computer-implemented artificial intelligence includes a neural network trained with a training set having a plurality of training vectors, each training vector having:

a set of training answers to a specified sequence of questions; and an associated set of specified solutions selected from the plurality of distinct software-implemented solutions.

In some embodiments, the computer-implemented artificial intelligence includes a generative artificial intelligence configured to produce the output report in response to a prompt, the prompt including the vector defined by the answers to the sequence of questions.

Yet another embodiment includes a computer-implemented system of managing a plurality of software solutions, each software solution useful for constructing or operating a large-scale industrial facility, the system including:

a computer memory storing:

a solution database defining a plurality of distinct software-implemented solutions, and a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

a user interface module configured to generate, on a computer display device, a graphical user interface producing a dynamic sequence of questions as a function of both the data model and answers to questions received from the user, said answers including user input, the sequence of questions configured to solicit from the user information about challenges relating to constructing or operating said large-scale industrial facility, the sequence of questions including:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question;

an automated report builder configured to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

In some such system embodiments, the solution database is indexed as a function of tools and solutions within the tools, each tool having tool information stored in the solution database, each tool having one or more solutions from the plurality of distinct software-implemented solutions.

In some embodiments, each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

In some embodiments, the graphical user interface automatically displays previously un-displayed sequential subsequent question after receiving an answer to a displayed predecessor question.

In some embodiments also include a computer-implemented artificial intelligence, said artificial intelligence configured to:

accept a vector defined by the answers to the sequence of questions; and to produce, from said vector, the output report that includes the set of specified solutions.

In some such embodiments, the computer-implemented artificial intelligence includes a neural network trained with a training set having a plurality of training vectors, each training vector having:

a set of training answers to a specified sequence of questions; and an associated set of specified solutions selected from the plurality of distinct software-implemented solutions.

Yet another embodiments includes a non-transitory computer-readable medium having computer executable code thereon, the computer executable code, when executed by a computer system, causing the computer system to perform a method, the method including:

providing, to the computer, a solution database defining a plurality of distinct software-implemented solutions;

providing, to the computer, a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

generating, on a display device in communication with the computer, a graphical user interface producing a dynamic sequence of questions as a function of both the data model and answers to questions received from the user, said answers including user input, the sequence of questions configured to solicit from the user information about challenges relating to constructing or operating said large-scale industrial facility, the sequence of questions including:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question;

causing an automated report builder to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

In some such embodiments, the solution database is indexed as a function of tools and solutions within the tools, each tool having tool information stored in the solution database, each tool having one or more solutions from the plurality of distinct software-implemented solutions.

In some such embodiments, each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

In some embodiments, the graphical user interface automatically displays previously un-displayed sequential subsequent question after receiving an answer to a displayed predecessor question.

In some embodiments, the method further includes providing a computer-implemented artificial intelligence, said artificial intelligence configured to:

accept a vector defined by the answers to the sequence of questions; and to produce, from said vector, the output report that includes the set of specified solutions.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

Those skilled in the art should more fully appreciate advantages of various embodiments of the invention from the following "Description of Illustrative Embodiments," discussed with reference to the drawings summarized immediately below.

FIGS. 7A, 7B, 7C and 7D (collectively referred to below as "FIG. 7") together are a schematic example of master map sample image.

DESCRIPTION OF ILLUSTRATIVE EMBODIMENTS

Figure 1:
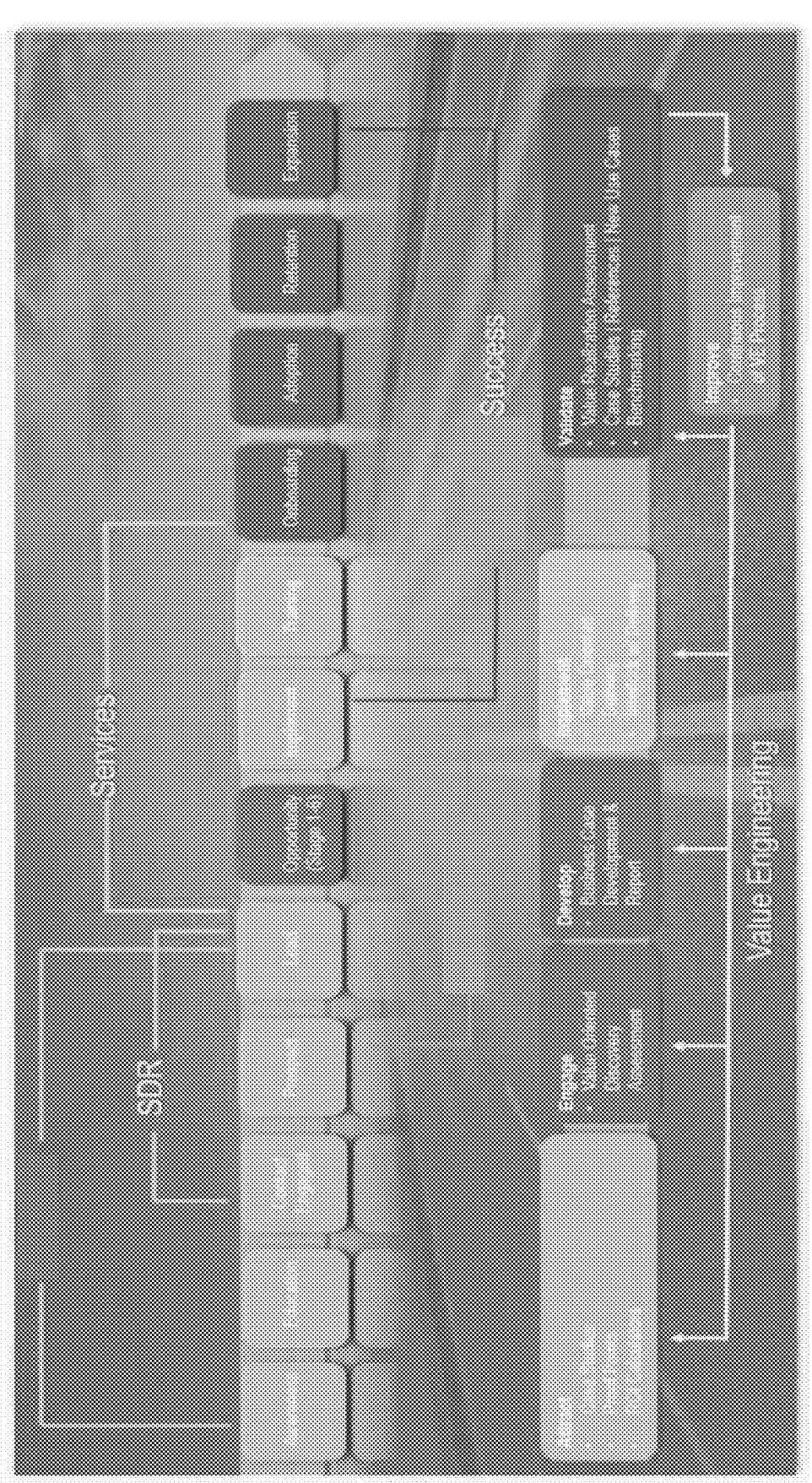
FIG. 1 is a schematic example of value engineering practice framework.

Illustrative embodiments allow non-experts to address problems in ways that previously required expertise in the form of deep knowledge of available solutions.

Many software products include a variety of functions and technical requirements. For example, a typical spreadsheet includes functions for performing mathematical operations on data within spreadsheet cells, functions for spell-checking text input by a user, and functions for creating and running a macro, which macro executes a pre-defined set of functions available in the spreadsheet software. As another example, a typical word processor includes functions for formatting text input by a user, functions for spell checking text input by a user, and functions for creating a running a macro, which macro executes a pre-defined set of functions available in the word processor software. However, a user having word processor software or spreadsheet software, but who needs spell checking functionality in a different software product, cannot use in that different software product the spell-checking functionality from the word processor or spreadsheet software.

In another example, a user having a drawing document created using Draw software (part of the OpenOffice suite of open-source software products) may not be able to open, view or edit that drawing document using Microsoft Visio software, for example due to differences in file format between Draw and Visio.

Further, not all available software products will work under the same operating system, and some will not work on a computer that lacks specific computer hardware (e.g., computer-aided design software may not operate on a computer that lacks graphics accelerator hardware). As such, an assembly of software products that seems appealing to a user may, in fact, fail to address the user's needs when one or more of such software products cannot be used on the user's computer system, or cannot be used together with other software on the user's computer system.

In addition, several constituencies (or "stakeholders") within an organization may have authority to influence what solutions are added to a suite of solutions.

For example, a community of end users need to make sure that the suite of solutions includes solutions to the specific challenges faced by the end users. In the context of the design, construction and operation of a power plant, for example, end users may include architects, builders, and operations and maintenance engineers, to name but a few examples.

Also, an organization's management needs to make sure that the suite of solutions includes solutions that further corporate goals, even if those goals are not of primary concern to end users. In the context of the design, construction and operation of a power plant, for example, corporate concerns may include keeping the project on schedule, and increasing power plant up-time (or reducing power plant down time), and limiting one the job injuries of plant workers. The suite of solutions may includes solutions that are in addition to, or different from, the solutions that would be selected by end users.

Also, the organization's information technology management team need to assemble, or guide assembly of, a suite of solutions that satisfies the other stakeholders (e.g., the end users and the organization's management), while also making sure that the solutions in the suite of solutions work with the organizations existing information technology infrastructure.

To those ends, various embodiments automate and guide selection of a suite of solutions from an array of available solutions. For example, the array of available solutions may include several solutions that each address a specific need or concern, and any one of those would satisfy an end user, but some of those solutions might not meet the needs of organization management and/or the organizations information technology team. Similarly, the array of available solutions may include several solutions that each address a specific need or concern, and any one of those would satisfy organization management, but some of those solutions might not meet the needs of end users and/or the organization's information technology team. Similarly, the array of available solutions may include several solutions that each address a specific need or concern, and any one of those would satisfy the information technology team, organization management, but some of those solutions might not meet the needs of end users and/or the organization's management.

Typically, it falls on the organization's information technology team to guide selection and assembly, from a plurality of available solutions, a solutions suite that satisfies all of the stakeholders.

Assembling a suite of software products that meets a user's specific needs presents a number of technical problems, and assembling a suite of software products that meets a user's specific needs requires not only knowledge of the user's specific needs (e.g., user needs spell check functionality; user needs ability to run macros; user needs ability to edit documents in given format), but also knowledge of which available software products have one or more of the required functionalities, and which of the available software products can operate with one another, or are interoperable (e.g., which software product can operate on a file created using a different software product). In some situations, the economics (e.g., return on investment) of acquiring an implementing a suite of software products bay be factor considered in the selection of software products.

The complexity of each software product from a large set of software products has traditionally made assembling a suite of software products (which suite collectively meets a user's specific needs) impossible for anyone without expertise as to both the functionality, and technical requirements and limitations, for each such software product.

In contrast, illustrative embodiments make available to non-technical users the ability to compile a suite of software tools (e.g., where such non-technical users are without expertise as to both the functionality, and technical requirements and limitations, for each software product from a large group of available software products), and does so without requiring such users to learn complex technical and functional details of each software product from a large number of available products.

For example, an organization (e.g., a company, a non-profit organization, an education institution, a government agency) may face problems that require a software solution on or available to the organization's computer system. Such an organization may engage one or more people to assist in selecting one or more available software products to individually or collectively address the problems. For example, those people may include a consultant, such an organization's information technology ("IT") manager, who is familiar with available software products, and an end-user who is familiar with problems faced by the organization. Those people may confer with one another so that the consultant understands the problems faced by the organization and so that the end-user learns about potential solutions available for implementation on the organization's computer system such that the end-user can select which of the available solutions to implement. As another example, a single person may be is familiar with both the problems faced by the organization and the potential solutions available for implementation on the organization's computer system, and can select which of the available solutions to implement. For ease of explanation, illustrative embodiments described herein may refer to both a consultant (e.g., an IT manager) and an "end-user" although in practice such embodiment may proceed with a single person in both roles.

Illustrative embodiments assist a consultant (e.g., an information technology manager) in determining which solutions, from among a plurality of available solutions, can be assembled in a solutions suite that satisfies all stakeholders. Illustrative embodiments employ one or more graphical user interfaces by which a user (e.g., an end user, a representative of the organization's management; an information technology manager) provides information as to the various needs and concerns faced by the organization.

For example, such a user interface may be a first graphical user interface (which may be referred-to as a "Master Map") graphical user interface configured to solicit information about the solution needed to execute a project. Such a graphical user interface is configured to present questions to a user, and receive the user's response to those questions. In illustrative embodiments, the graphical user interface may present a question with several graphically-displayed options (e.g., each option may be a pre-defined potential response to the question, such as in the form of a drop-down menu or a matrix of selectable option). That format guides the user to provide information in a restricted (e.g., not free-form) format so that the information is useful for later analysis.

The user's answers to the questions of the Master Map graphical user interface narrow the list of available solutions to a set of solutions that collectively meet the needs of the project. That set of solutions may include more than one solution for each such challenge, however, and so that set of solutions may not be the final set of solutions, Moreover, other factors (e.g., end-user concerns, management concerns; IT concerns) may still need to be addressed.

In illustrative embodiments, the user interface may, in addition to or instead of the Master Map graphical user interface, include a second graphical user interface (which may be referred to as a "Challenges Map" or a "From Challenges to Solutions Map") configured to solicit information about the needs of the end users. The Challenges Map gathers information to identify the "right solutions" from among the available solutions, pursuant to the end-user's goals, for example to make sure the end user has the tools available to do what the end user needs to do, for example to build and/or operate and/or maintain a plant.

In illustrative embodiments, the user interface may, in addition to or instead of the Master Map graphical user interface and/or Challenges Map, include a third graphical user interface (which may be referred to as a "Solutions Map") configured to solicit information about the needs of the organization's management.

Information output by the foregoing graphical user interfaces may be described as a "vector" or "suite vector." That vector may be applied (for example, as input to an artificial intelligence) to produce, from an array of available solutions, a suggested suite of solutions that meets the needs of all stakeholders. In illustrative embodiments, the vector produced from the user's responses to the one or more graphical user interfaces described above includes information identifying each solution that meets one or more of a stakeholder's needs (or a software product that includes such a solution), along with a textual description (e.g., in prose) of each such solution or software product. That description may include a description of the functionality of the solution or software product, and may include a set of benefits provided by the solution.

In some illustrative embodiments, a system is configured to quickly identify relevant solutions from a complex portfolio of products that each may incorporate one or more solutions. This system therefore enables determination of a customized set of solutions for a particular end-user of the solutions. In addition to benefiting the end-user of the solution(s), this system also helps the consultant (e.g., IT manager) researching and proposing the solutions. Details of illustrative embodiments are discussed below.

Definitions: As used in this description and the accompanying claims, the following terms shall have the meanings indicated, unless the context otherwise requires.

A "set" includes at least one member.

A "solution" is a feature of a software product that provides a specific functionality or capability of the software product.

Specifically, various embodiments provide a structured value engineering practice framework that empowers value-oriented solution identification, value delivery and proactive value realization via a structured process that targets key organization or end-user touch points along the entire suite lifecycle. The framework is designed to establish interlocks between stakeholders to ensure a consistent value-oriented approach to developing a set of software solutions. See FIG. 1 for an example of a value engineering practice framework enabling these goals.

The inventors have identified pockets of value-based analysis efforts taking place within organizations. Undesirably, these pockets typically are not repeatable, scalable, comprehensive, or sustainable. As a result of the disjointed nature, the current state of the art has one or more of the following challenges:

Consultant-Side Challenges

Selection cycle too long,

Focus on communicating product or service benefits at the expense of relating them to the value or business outcomes they drive, Pricing not in line with organization expectations. For example, pricing may not meet net present value (NPV), internal rate of return (IRR), or return on investment (ROI) requirements, Differentiation tends to be focused on product features, not connected to the ways end users define value before or after implementation, Proof points (e.g., examples) for successful outcomes when using consultant's products are rarely available, Unable to gain end-user team consensus, No process to help end-users measure value they have realized in terms of business outcomes, Unable to show value of current investment.

End-User Side Challenges

Limited time to engage with end-user during the assessment process,

No or minimal budget or budget not aligned to organization requirements,

Internal politics prevent agreement between various end-user personas,

Unable to measure and showcase realized value.

Illustrative embodiments provide automated, easier to use, and simplified processes for managing some or all aspects of the "value journey". This value journey may be considered to have three distinct stages.

Value Discovery—Both the end-user and the consultant need a reason to initiate meaningful conversations. End-users need a directional sense of potential business value and consultants need an efficient way to:

Gain insight to the end-user's business needs,

Gain insight to the end-user's expected business outcomes,

Quantify a business value hypothesis,

Gain end-user agreement to collaborate on the business case development.

Value Delivery—This collaborative stage includes:

Transparent and defendable business case development aligned to the value hypothesis, Transfer of ownership of business case to end-user, Transform business case into scope of work (SoW), Implement solution based on SoW.

Value Realization—following the successful implementation, this stage includes:

Measuring and Reporting actual value achieved relative to the original value hypothesis, Ensuring end-user satisfaction, Capturing of case studies, testimonials, proof points, and new use cases, Illustrative embodiments address each of these three stages as discussed below. It should be noted that in various embodiments, a product has one or more "solutions" that each may be useful for to complete a task. For example, a given product may have sub-products/processes/results A, B, and C. Each one of A, B, and C is a solution. End-users often do not need to acquire the entire product if they just need one of the solutions. The inventors recognized that consultants could parse out only appropriate solutions to meet end-users' needs. Continuing with the example above, a given end-user may need just solutions B and C. As such, various embodiments direct the end-user on a solution basis and not necessarily on a product basis.

PHASE 1: Value Discovery

Figure 2:
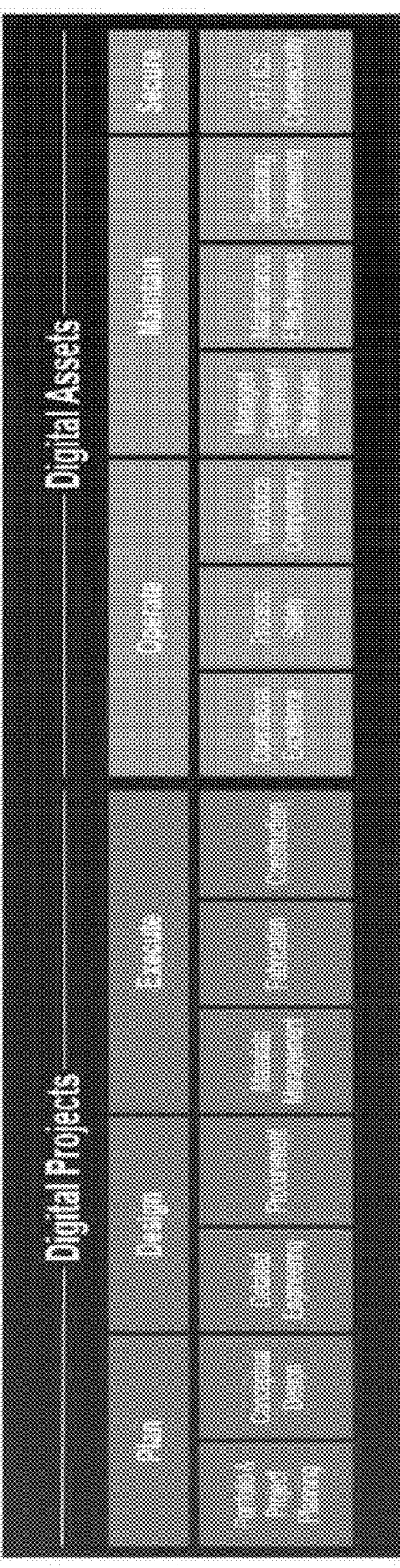
FIG. 2 is a schematic example of SDR for a large-scale capital project platform.

Value Discovery may be considered, in some embodiments, to have at least two segmentations: Value Discovery Pre-Stage 1 and Value Discovery Stage 1-Stage 6. Pre-Stage 1 relates to end-user self-discovery, while Stage 1-Stage 6 relates to the time the consultant is actively engaged with a qualified lead. Value Discovery preferably leverages a series of discovery questions that enable both the consultant and end-user to uncover end-user pain points and challenges in alignment with the so-called "Smart Digital Reality," (SDR). FIG. 2 schematically shows an example of an SDR for a company that produces a large-scale capital project platform (discussed in greater detail below). This exemplary SDR operates from planning through security stages. This is known as the entry point for value discovery and is outlined in more detail below.

Value Discovery Entry Point

Econometric model design supports a solution to product hierarchy that aligns to the consultant's consultant SDR. For example, a digital asset econometric model enables consultants to position multi-product solutions to end-users. The same model would also support an "Operate", "Maintain" or "Secure" solution opportunity. While not all opportunities will be for multi-product solutions, the models preferably can drive down to specific products within the consultant's consultant portfolio of available solutions. Models will be delivered over time as the VE process mature. Accordingly, to ensure that any product specific model seamlessly integrates into the SDR, the consultant's consultant team will be responsible for additions and continuous improvement of econometric models.

Value Discovery Pre-Stage 1

Figure 3:
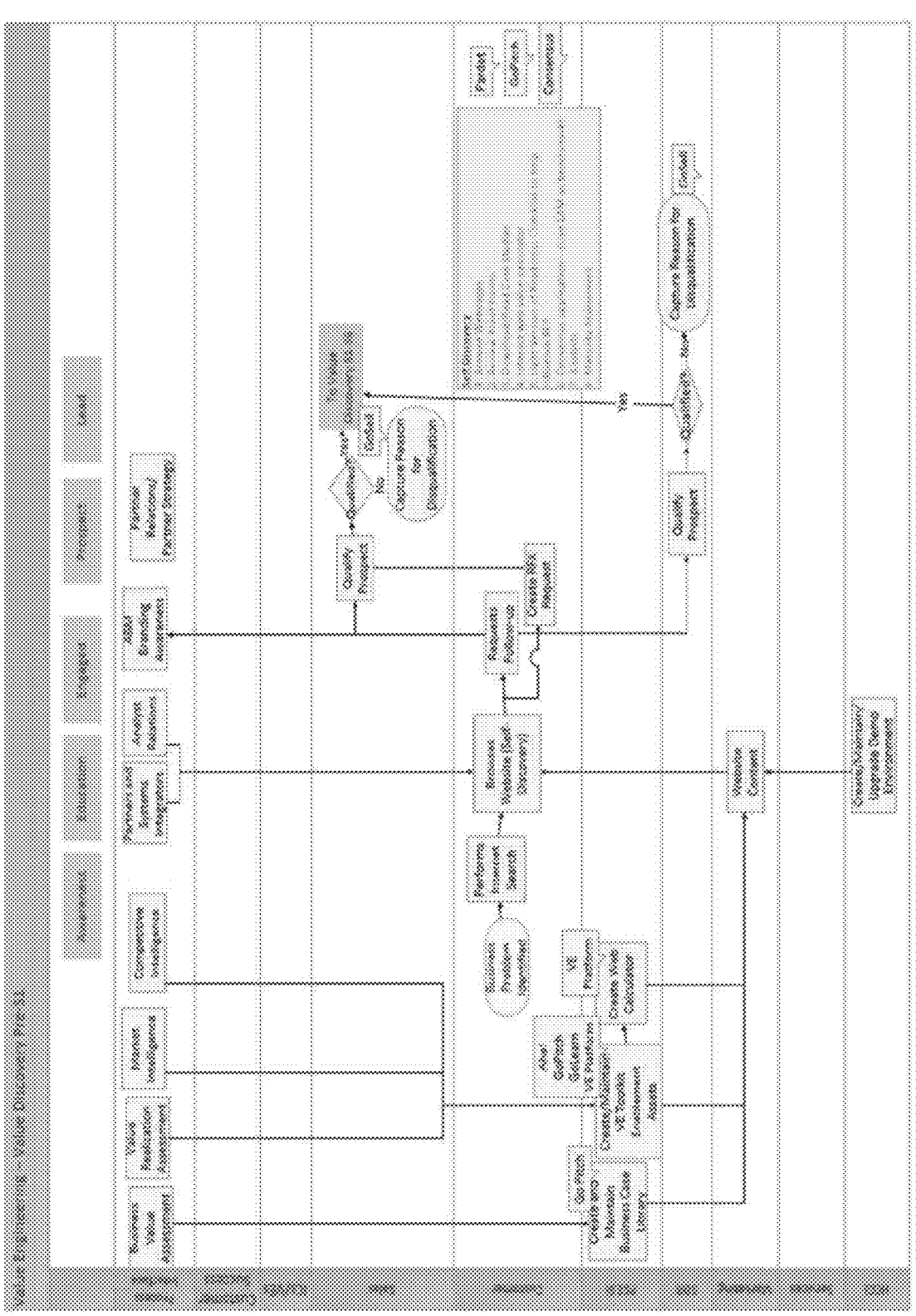
FIG. 3 is a schematic example of value discovery pre-stage 1 (self-discovery).

Value Discovery Pre-Stage 1 is the part of the value engineering work process that focuses on leveraging value engineering assets, such as case studies, proof points, and web value models, to help influence end-user behaviors and potentially influence RFPs as stakeholder interact with our websites during self-discovery. FIG. 3 schematically shows an example.

Value Discovery Stage 1-Stage 6

Figure 4:
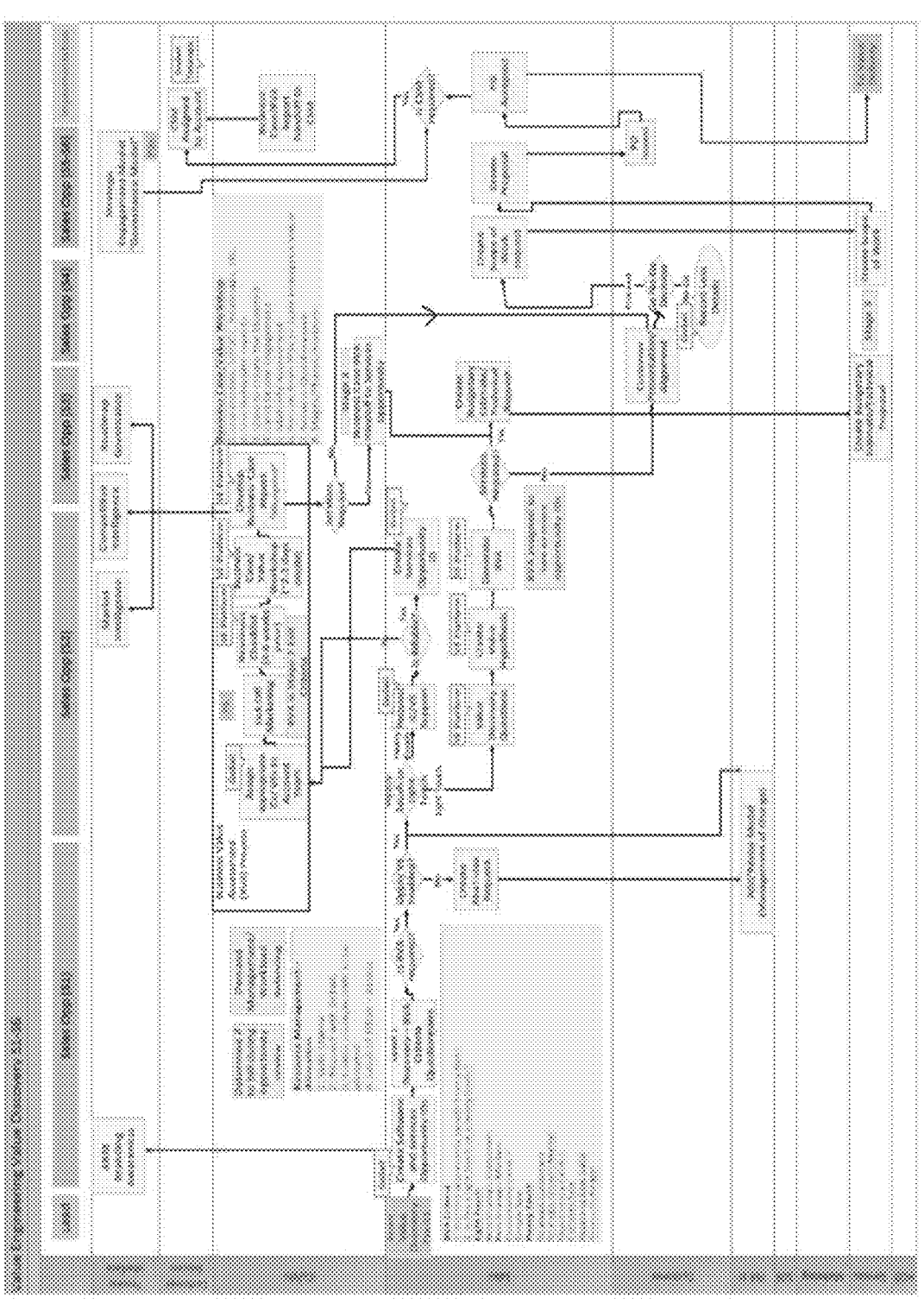
FIG. 4 is a schematic example of value discovery Stage 1-Stage 6 (business value assessments).

At stage 6, two opportunity IDs are created in a reminder system (e.g., some embodiments use Salesforce™ (GoSell)). The consultant creates a software opportunity and a services opportunity. Ideally, a business value assessment (BVA) can be assigned to two opportunity IDs, but if not, the consultant will assign the BVA to the software opportunity. See FIG. 4 as an example.

Some embodiments may use a light touch/heavy touch methodology for BVAs. Heavy touch BVSAs typically are to be executed by consultants value engineers and industry consultants and will target some percentage (e.g., 15%) of net new opportunities. These are the needle movers. Heavy touch is where SIPOCs, heat maps, and other value engineering tools come into play.

Light touch BVAs should be executable by the stakeholder or by the account manager. Light touch has similarities to value hypothesis models. The consultant can target some percentage (e.g., 85%) of net new opportunities to be covered by the light touch approach. Exit Criteria for Stage 2 net new software opportunities should include a business value assessment (light or heavy).

PHASE 2: Value Delivery

Figure 5:
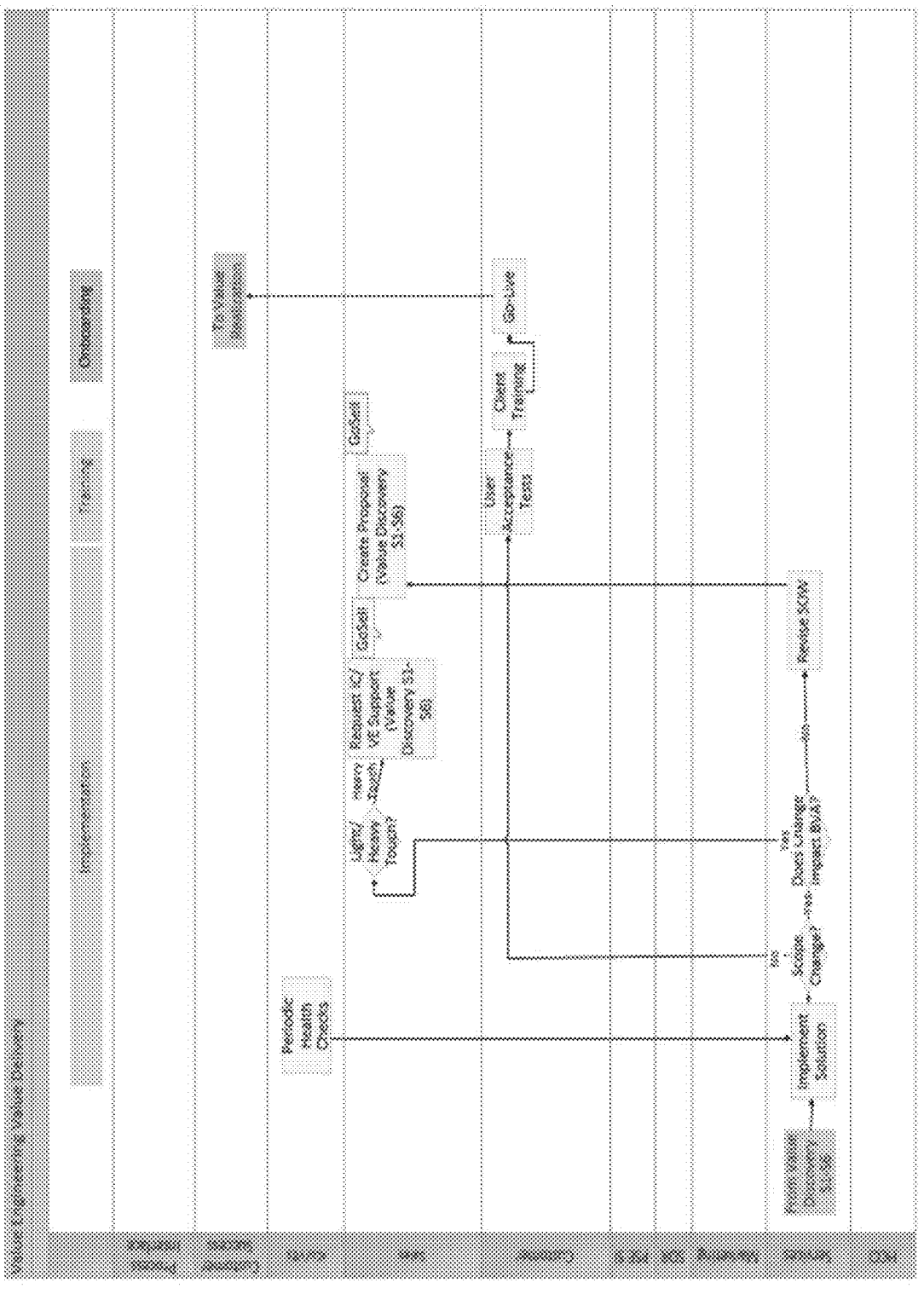
FIG. 5 is a schematic example of value delivery (interlock with services).

Value Delivery is the part of the work process that defines how to interlock the business value assessments, both light and heavy, to delivery. The process design also enables the triggering of revisions to the original business case as scope changes during implementation. See FIG. 5 for an example of value delivery.

PHASE 3: Value Realization

Figure 6:
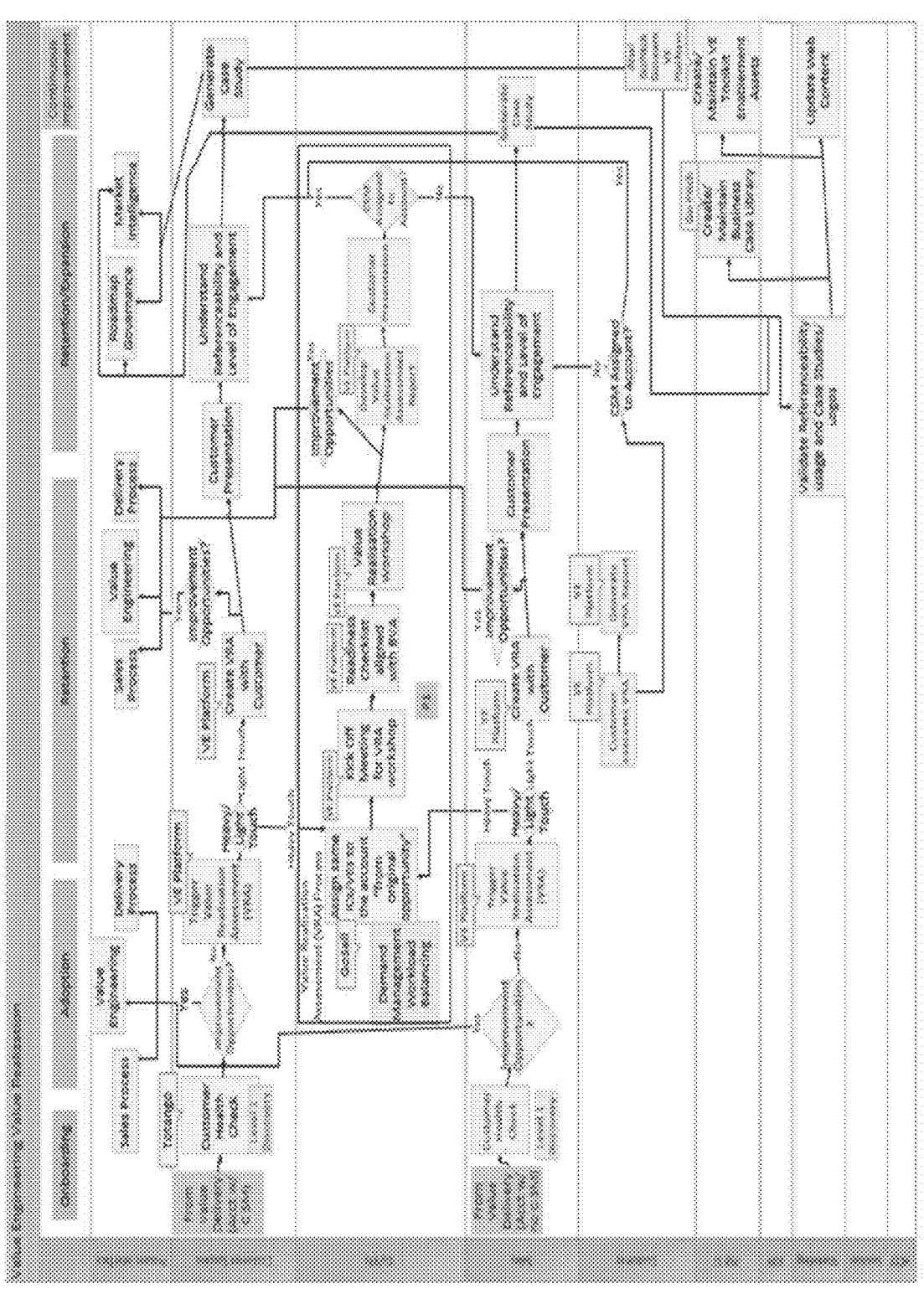
FIG. 6 is a schematic example of value realization (value realization assessments and case studies).

After delivery is complete, end-user success managers (CSMs) account managers, or end-users should be able to execute value realization assessments. In illustrative embodiments, a CSM is a professional responsible for ensuring that end-users of a company or organization achieve their desired outcomes and derive maximum value from the products or services they have implemented. Some embodiments also use a light and heavy touch approach during this part of the process as well. If the BVA was a heavy touch, then the value realization assessment (VRA) may be a heavy touch. If the BVA was a light touch, then it could be either heavy touch or light touch for the VRA. See, for example, FIG. 6, which is an example of value realization.

Interaction of the components is important. To that end, illustrative embodiments a series of "mind maps" developed to understand how end-user's goals, initiatives, strategies and challenges can be addressed through the utilization of a "smart digital reality" and various associated solution areas (i.e. portfolio hierarchy) by enabling the end-user to derive value from key value leak areas within their existing work processes. For discussion purposes, illustrative embodiments may consider using the Hexagon Smart Digital Reality™ suite. Accordingly, discussion generically of a smart digital reality, such as the Smart Digital Reality™ suite, is for illustrative purposes only and not intended to limit all embodiments.

Illustrative embodiments maintain three primary mind maps:

Master Map: a hierarchical structure of all available solutions,

Challenge Map: a hierarchical structure that provides solutions to various questions/challenges.

Solution Map: a hierarchical structure enabling one to arrive at the appropriate set of solutions for an end-user. Below is an explanation and various embodiments of all three mind maps and how they interrelate.

Master Map

The master map refers to the physical mapping of products from executive strategies through to industry work processes. For some or all executive strategies, there are one or more business strategies that relate to multiple end-user types in the management of a plant or facility in various types of industries. It is under these important strategies that organizations develop written work standards that define the supporting work processes to properly carry out duties based on organizational goals, industry best practices, and the specific requirements for different job roles. It is within these work processes that the consultant identifies specific products that provide the greatest value for their end-users.

The consultant (e.g., internal consultants) use this map to reference products in their proper context of how and where our end-users apply them within their business. The map can be made easily accessible through a published URL and navigable using filters and tags that allow the consultant to narrow their focus to a product or group of products that most interest them and their end-user. In addition to simply referencing the proper work process with the available product, it also acts as a repository of documented work processes in the form of "swim lane diagrams" that internal consultants can click on to view and understand how: 1) the work process is carried out by different job roles and 2) it interacts with other products within that work process.

As an administrator, this may be used as a "universe map" to record work processes and their workflows as the consultant develops models with different portfolio segments of its business. Specifically, in illustrative embodiments, the universe map is a visual depiction designed to elucidate multiple dimensions of the consultant's solutions in relation to end-user's business objectives, strategies, challenges, operational workflows, and the tangible benefits achievable through the implementation of consultant's technology within these workflows.

Figure 7B:
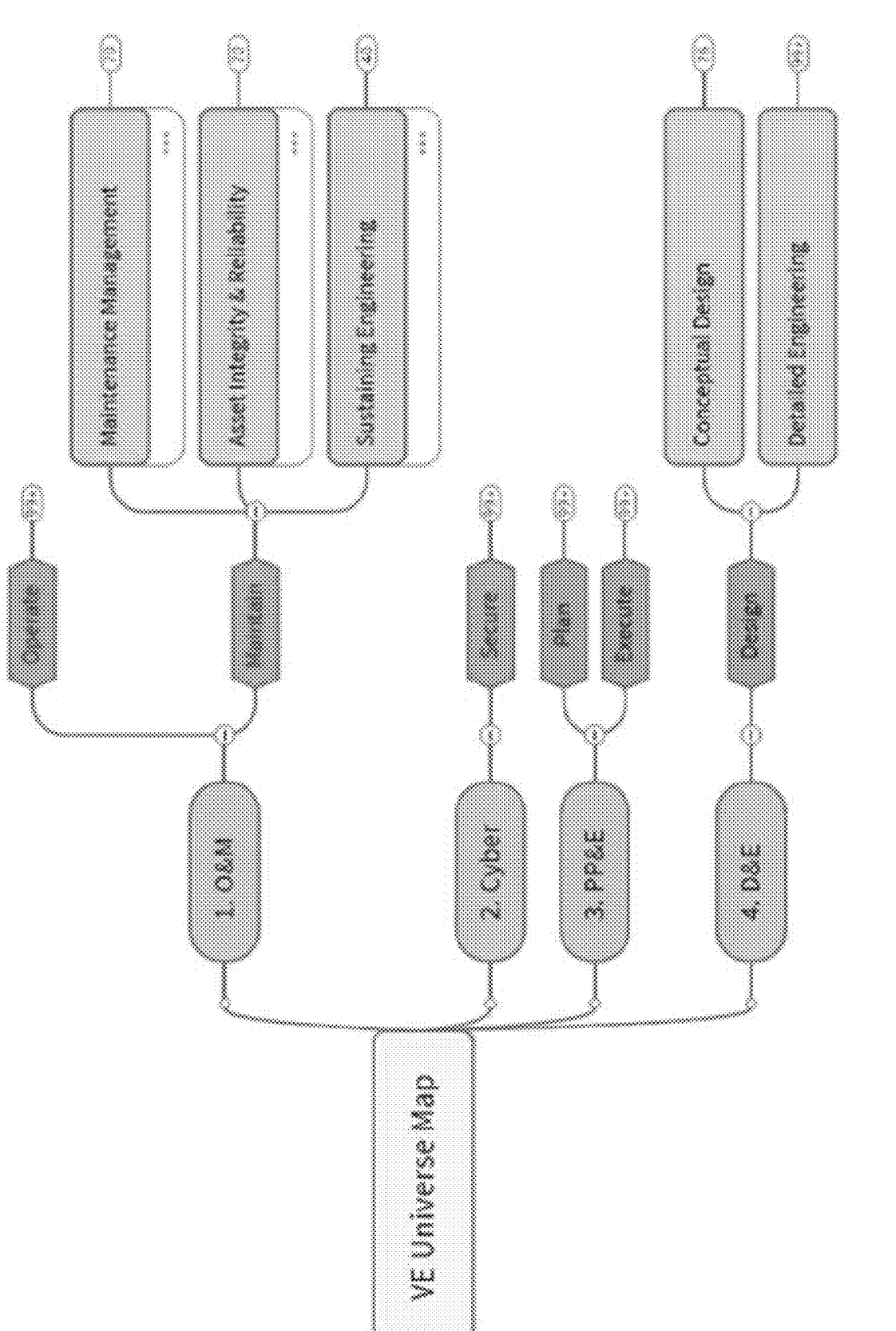
Figure 7C:
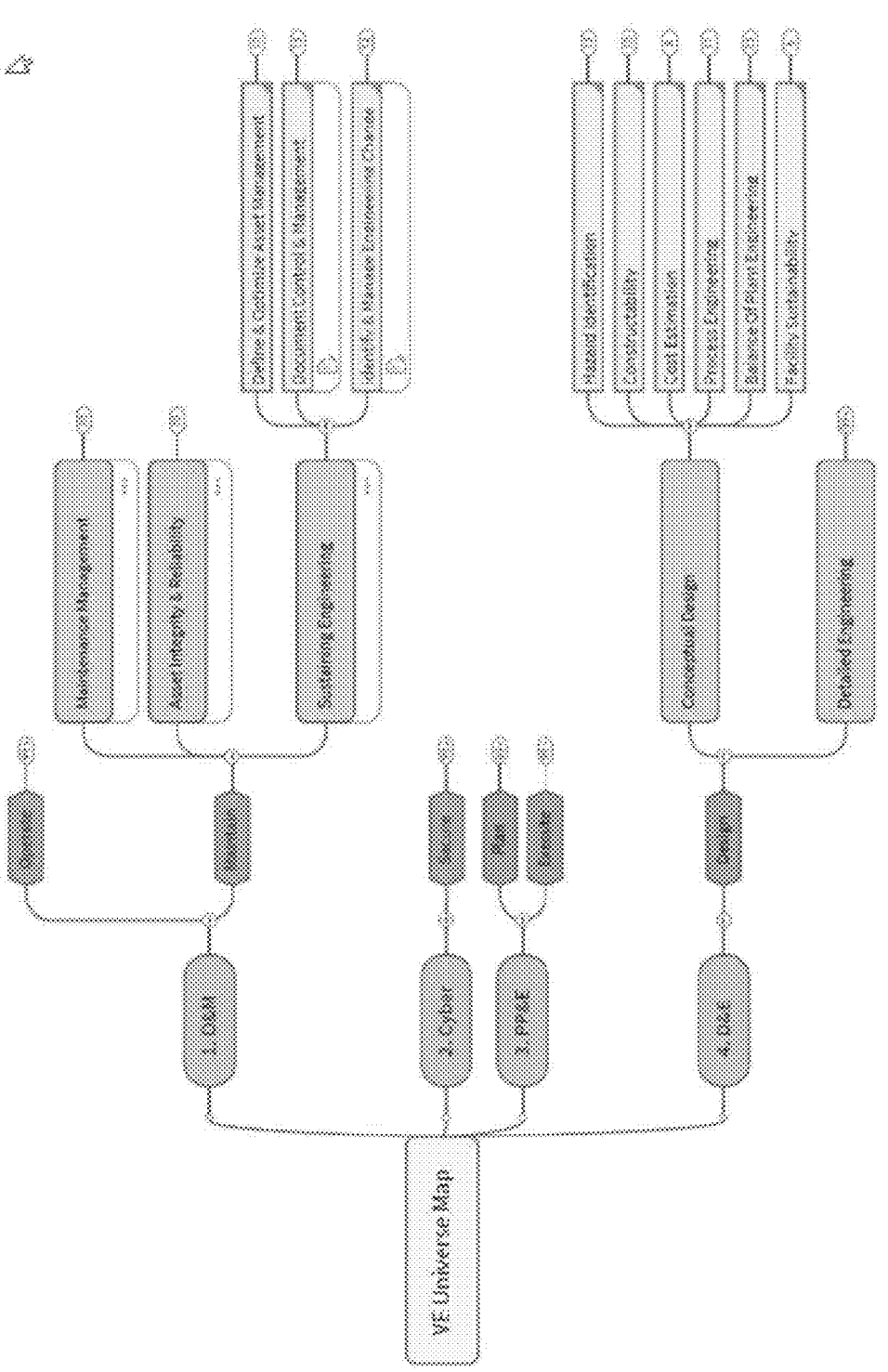
Figure 7D:
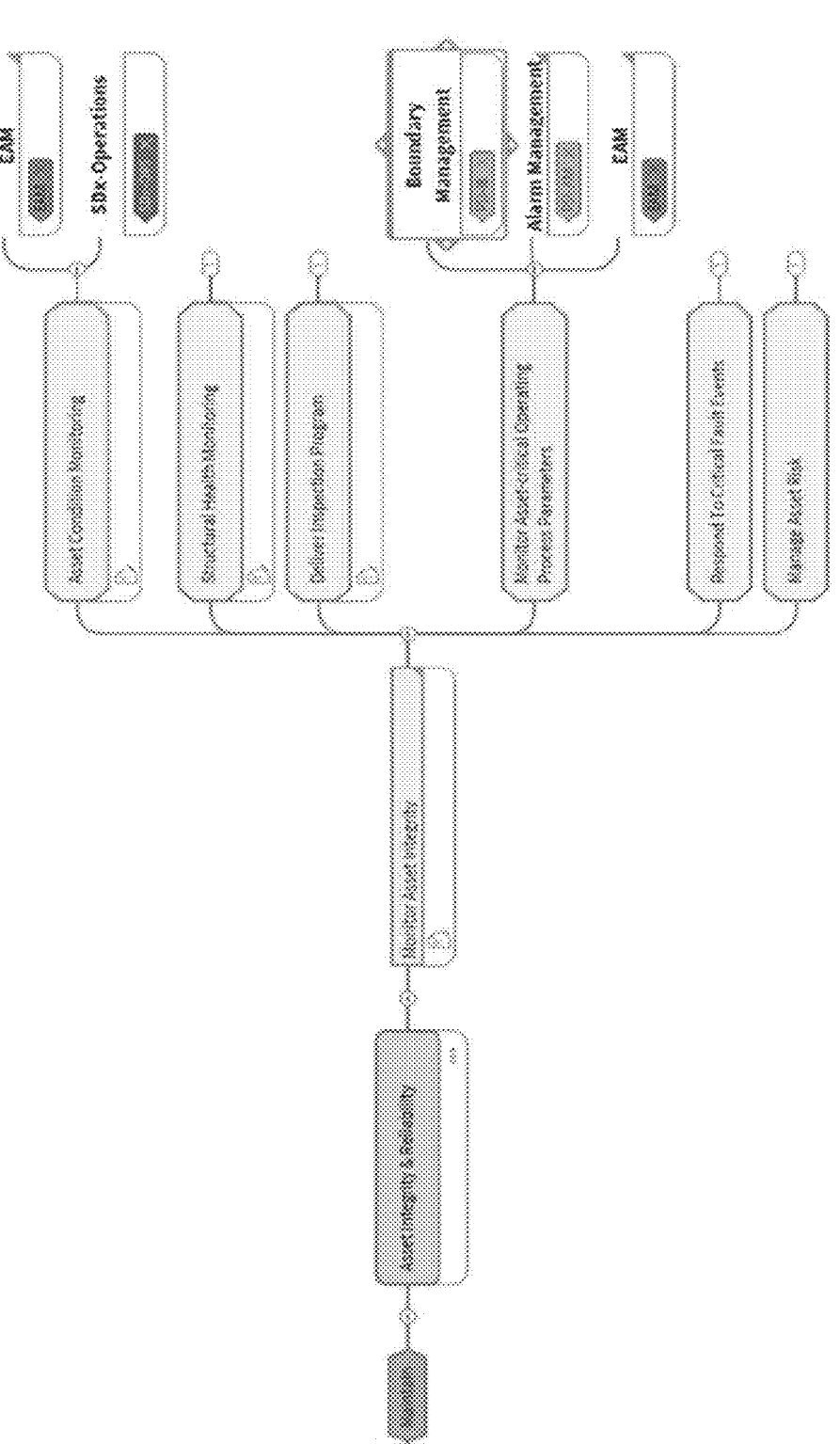

As part of the workflow of developing models, the consultant works with internal SME's, end-users, and analysts to identify industry standard work processes that relate to Smart Digital Reality of operate, maintain, secure, design, plan and execute. After these are recorded, consultants with expertise in the product and industry in question identify how their perspective product(s) fit into each of the recorded work processes. Illustrative embodiments also include the proper swim lane diagrams that relate to the standard work process and embed them into the map. FIG. 7 shows an example of a master map.

Updates to the map may be completed in any number of manners, such as with use of a product known as Mind-Manager™, which can create, edit and publish the master map. Updates are typically carried out during the model building process. Ideas for changing or enhancing the mapping can also be submitted by any employee using our ideas platform called Aha!. These ideas are tracked and reviewed by the value engineering stakeholders and implemented when approved.

Challenge Map

The challenge map relates to the physical mapping of available products from executive strategies to their challenges and benefits derived from a product's econometric model. For every executive strategy, there are one or more business strategies that relate to multiple end-user types in the management of a plant or facility in various types of industries. It is under these important strategies that organizations develop written work standards that define the supporting work processes. It is at the work process standard level that some embodiments may identify specific products, derived from the master map, alongside a common challenge that end-users encounter and the benefit of the product to meet that challenge.

Among other ways, the consultants may use this challenge map to reference how modeled benefits and consultants products tie into the smart digital reality at a more granular level. The map may be easily accessible through a published URL and navigable using filters and tags that allow the consultant to narrow their focus to a product or group of products and their related benefits and challenges that most interest them and their end-user. It also gives the internal consultant perspective of how different solutions can address different aspects of a common challenge within various work process standards. Hence, illustrative embodiments provide them a true solution to a end-user's challenge(s). As an administrator, this may be used as a modeling map to record product/benefit relationships during the model building process. As part of the workflow of developing models, the consultant may work with internal SMEs, end-users, and analysts to develop talk tracks that use these challenges and benefits to aid the end-user, and consultants during the execution of the business value assessment.

Figure 8A:
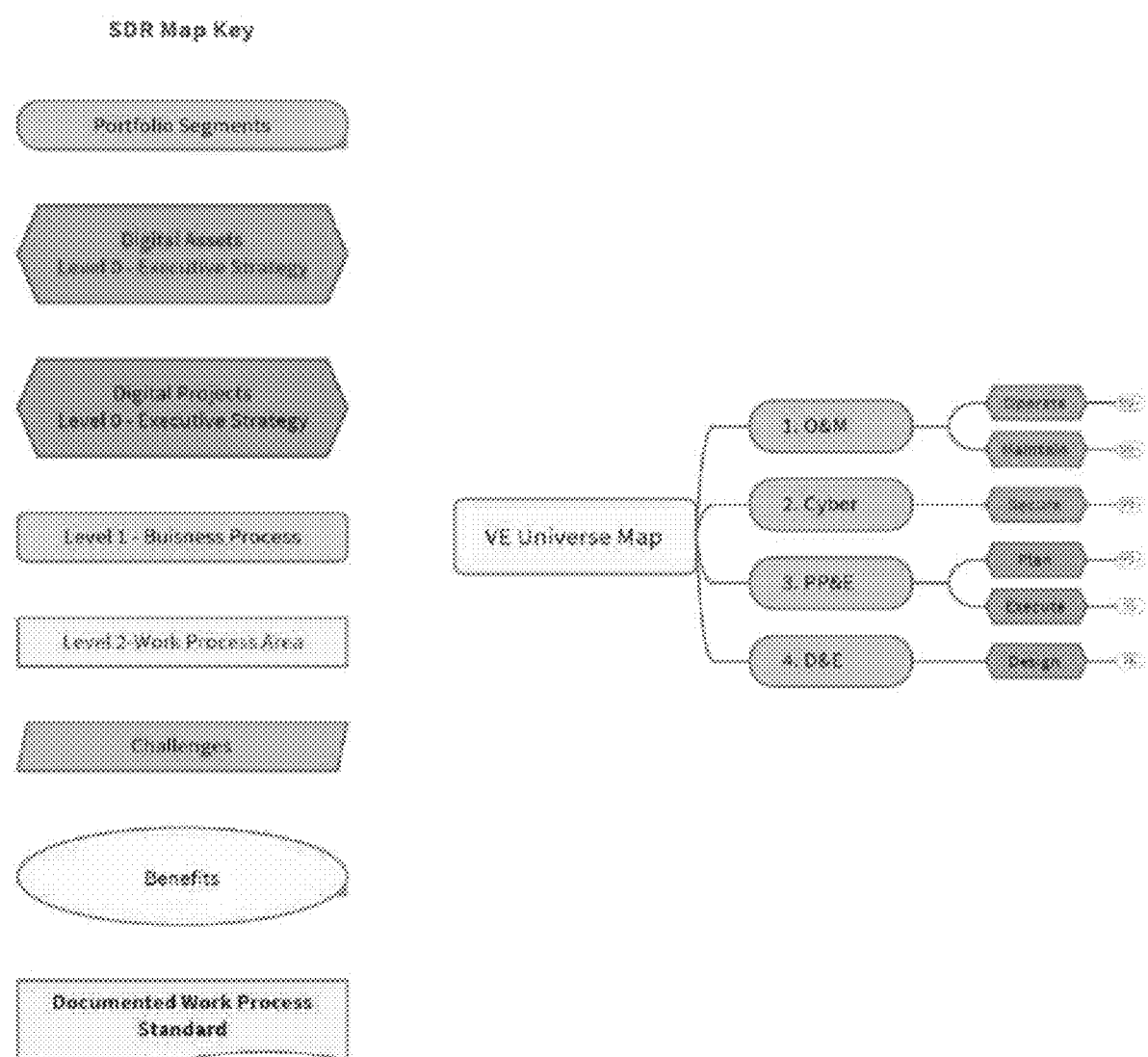
FIGS. 8A, 8B and 8C (collectively referred to below as "FIG. 8") together are a schematic example of challenge map.
Figure 8B:
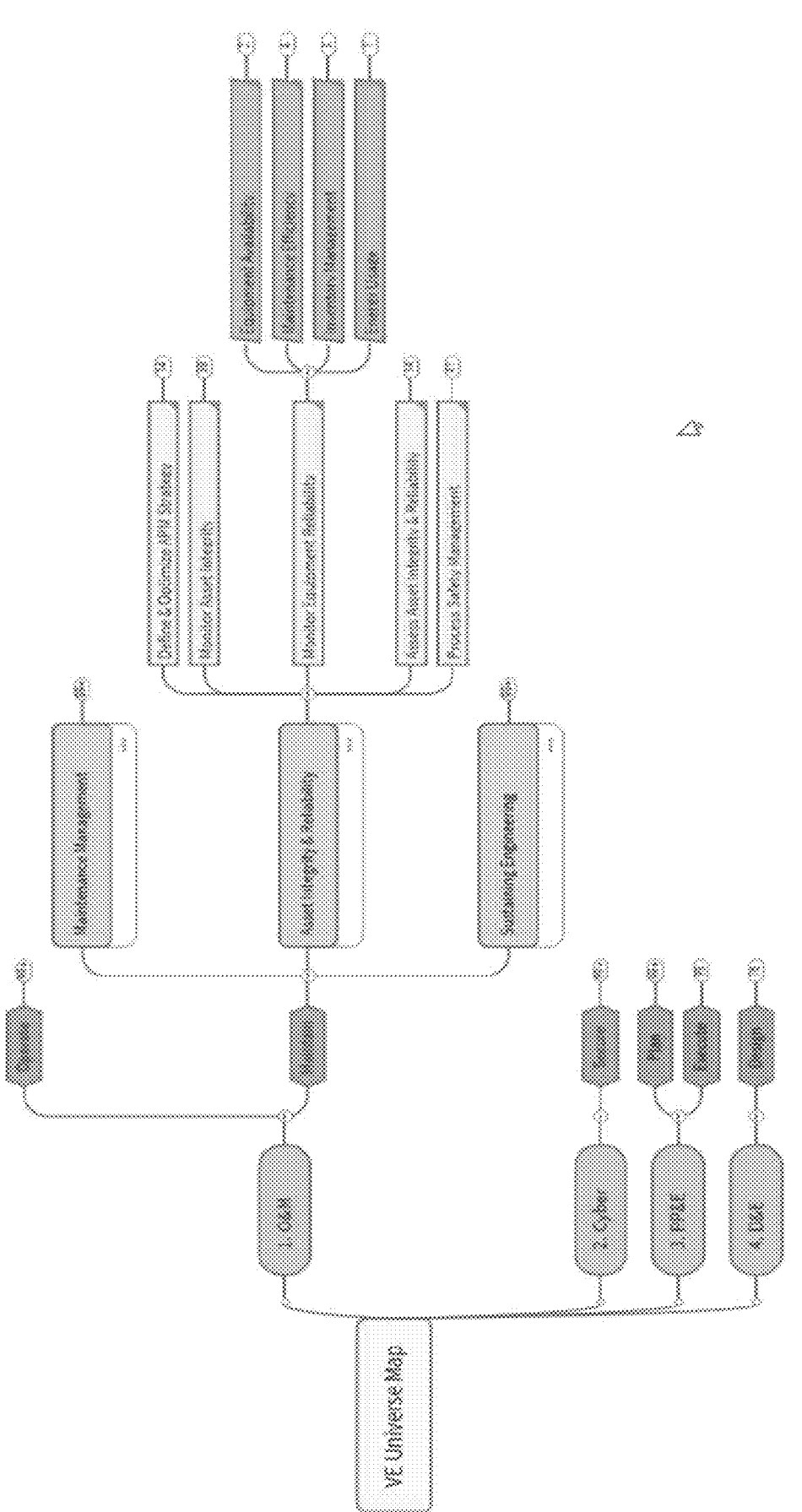
Figure 8C:
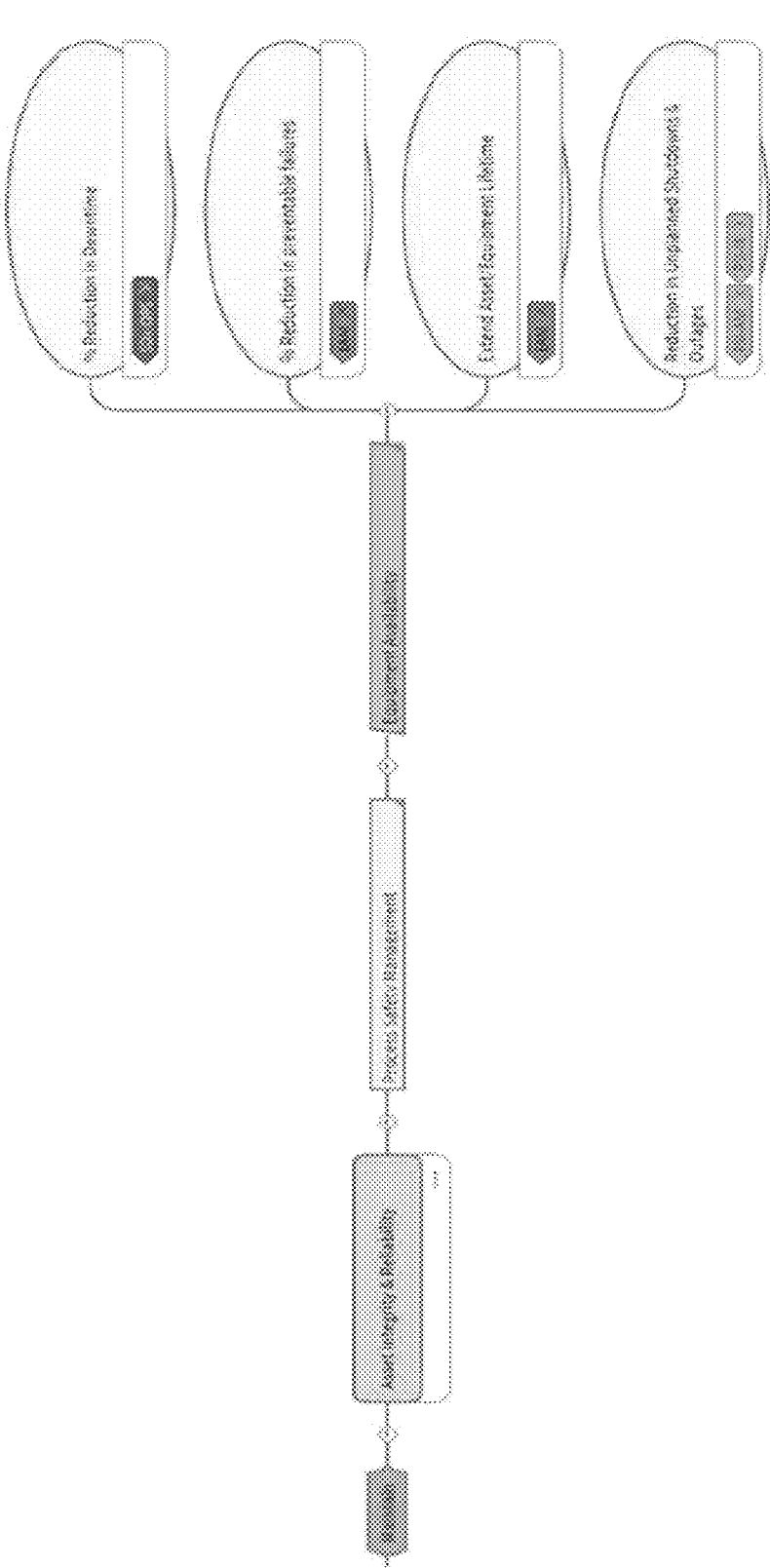
Figure 9A:
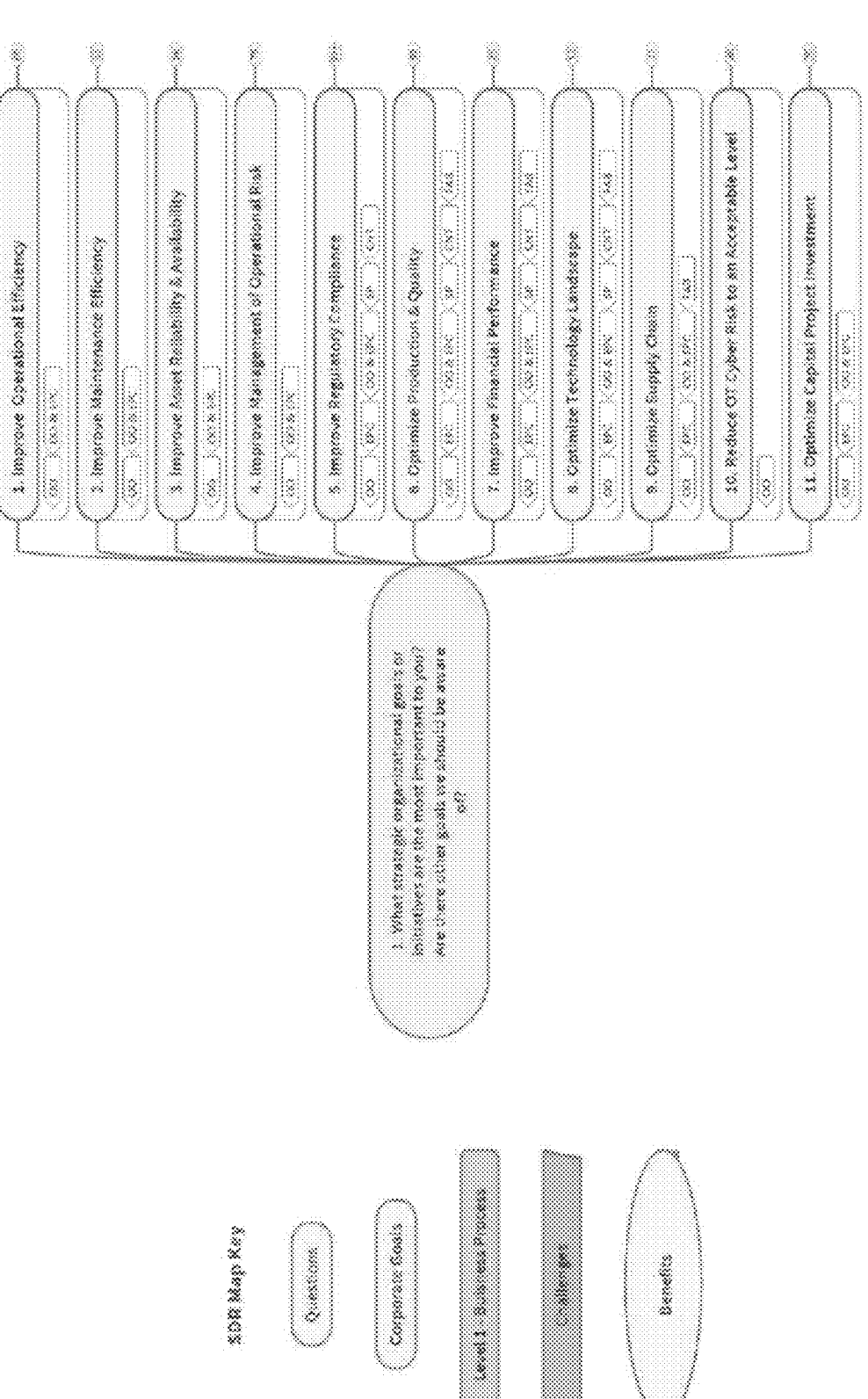
FIGS. 9A, 9B, 9C and 9D (collectively referred to below as "FIG. 9") together are a schematic example of a solution map.
Figure 9B:
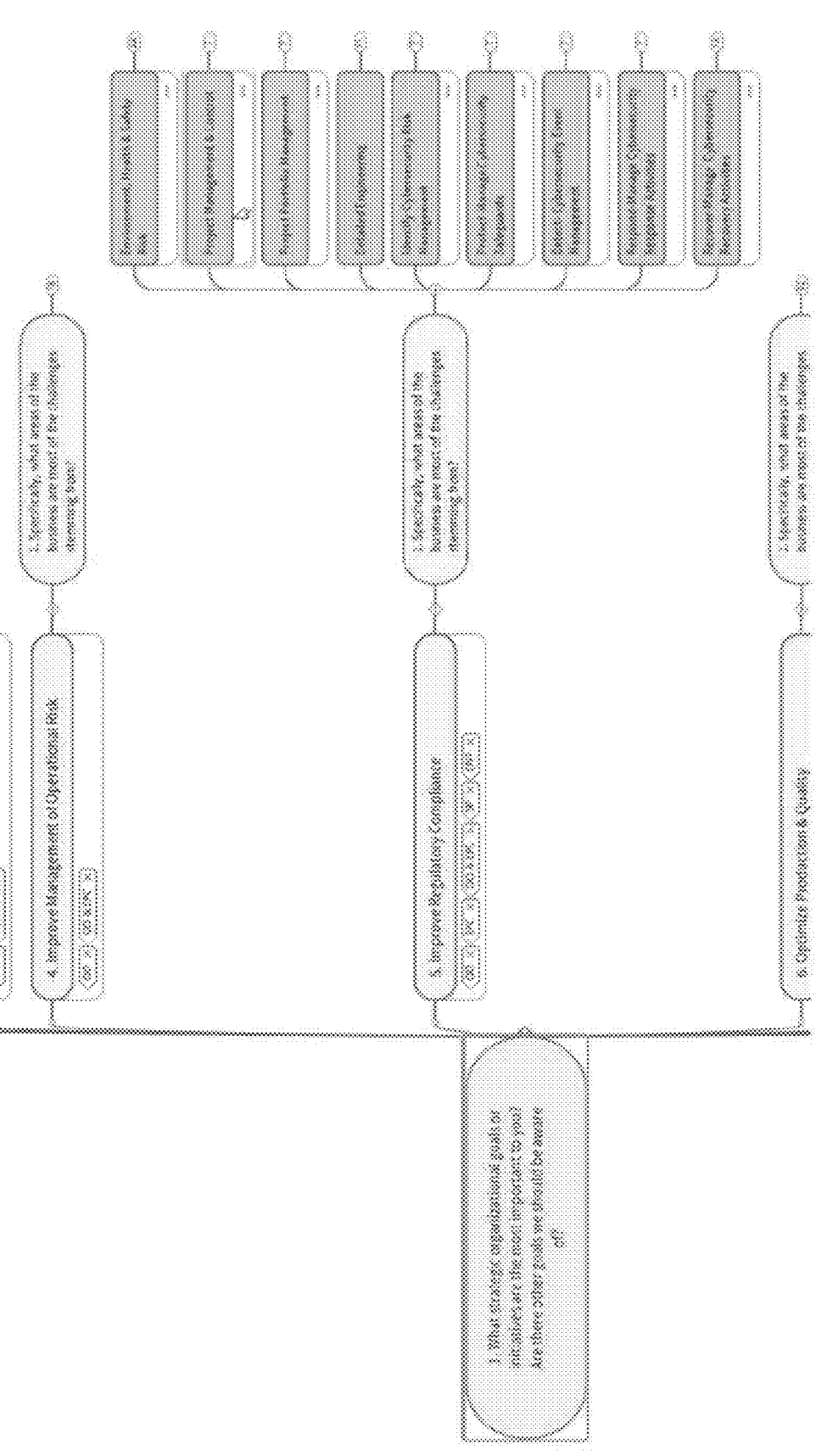
Figure 9C:
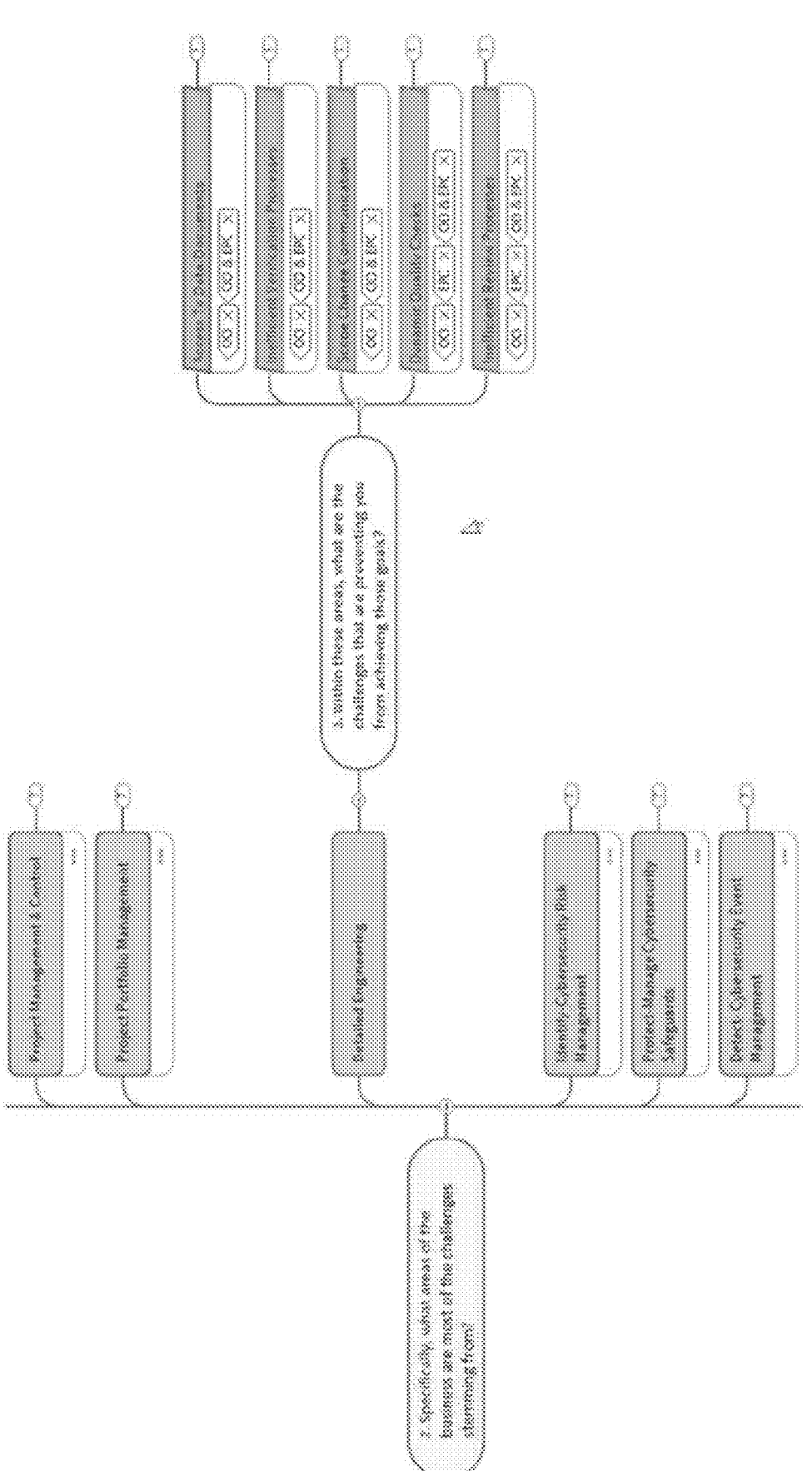
Figure 9D:
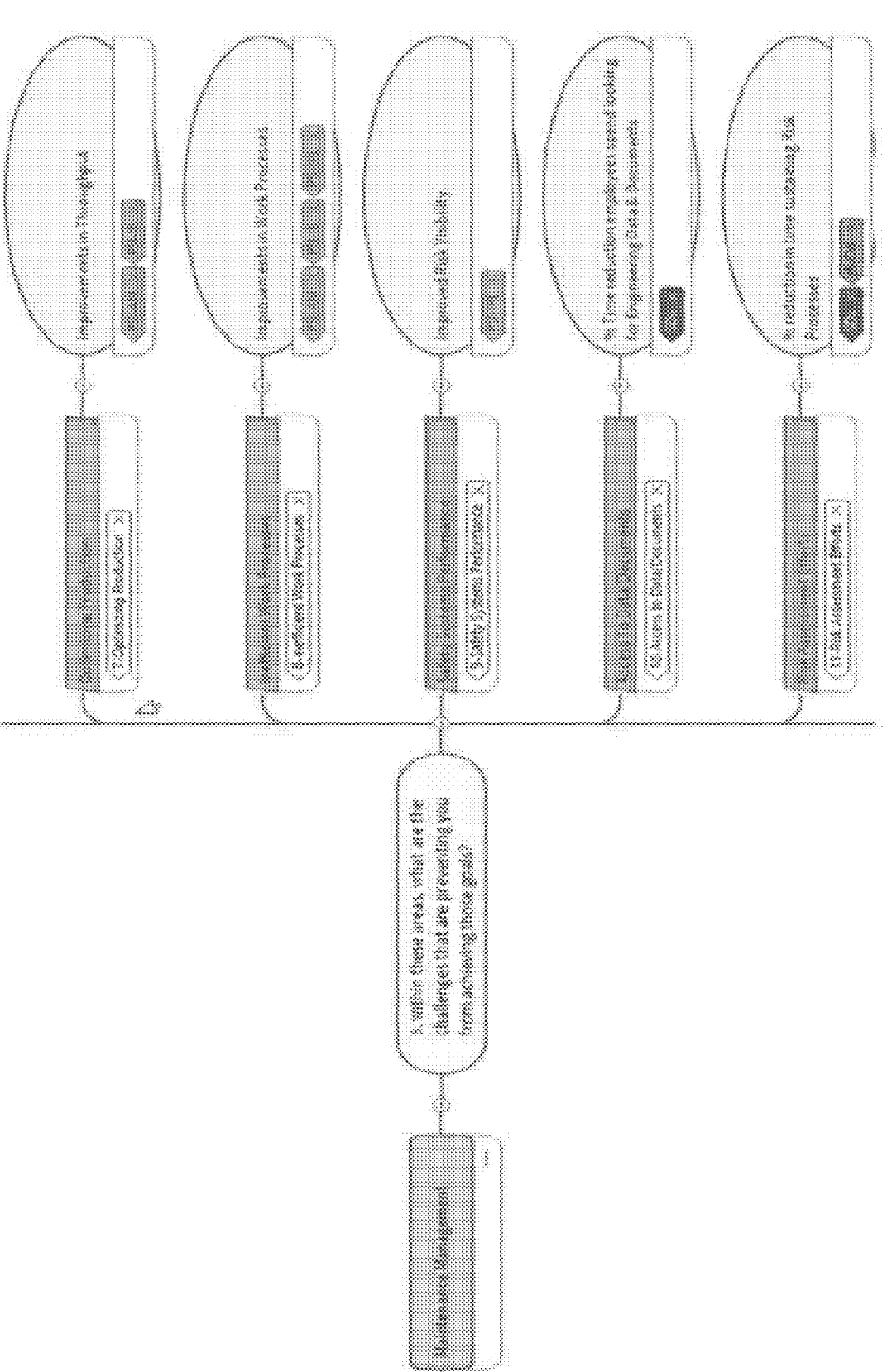
Figure 10:
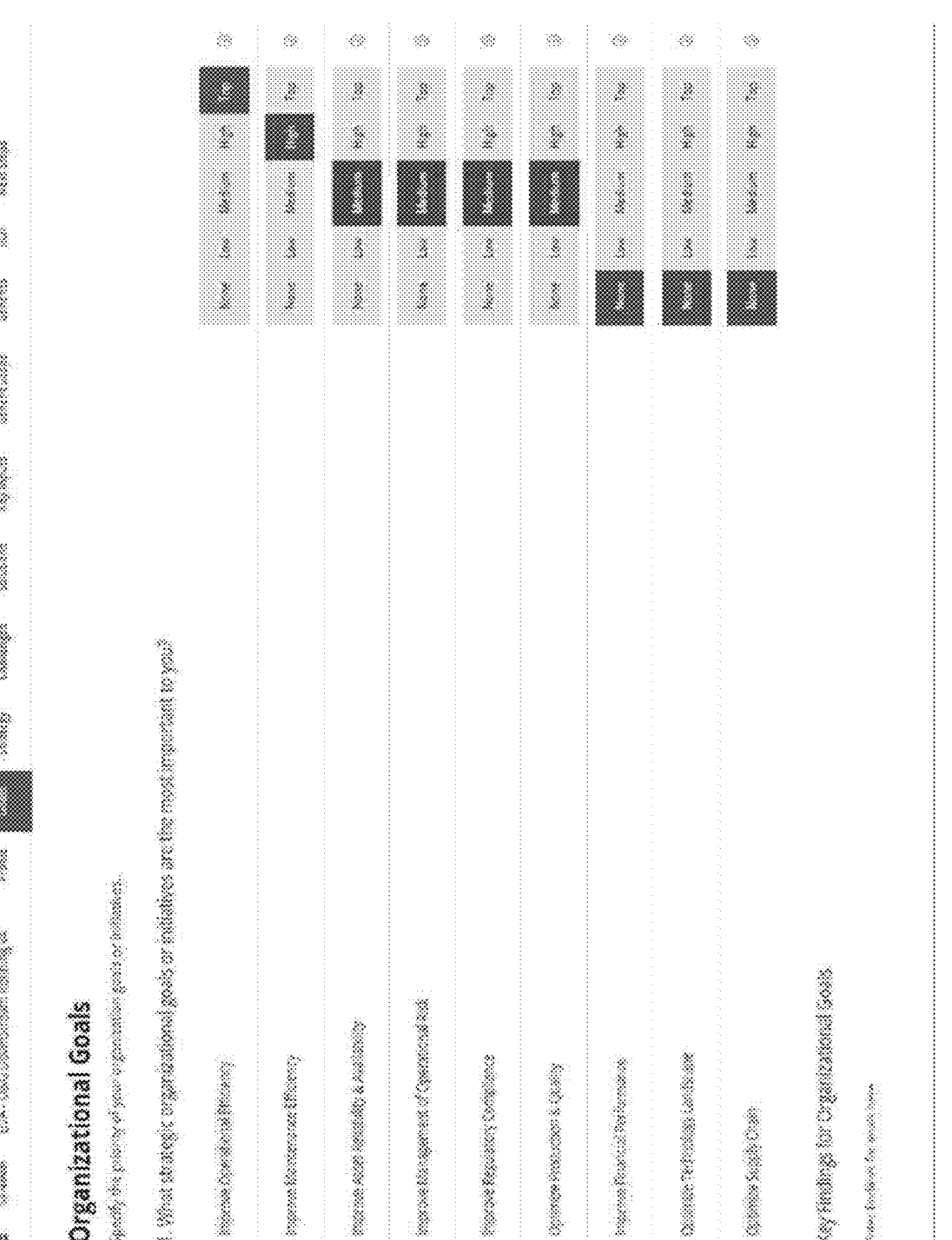
FIG. 10 is a schematic example of business value assessment.
Figure 11:
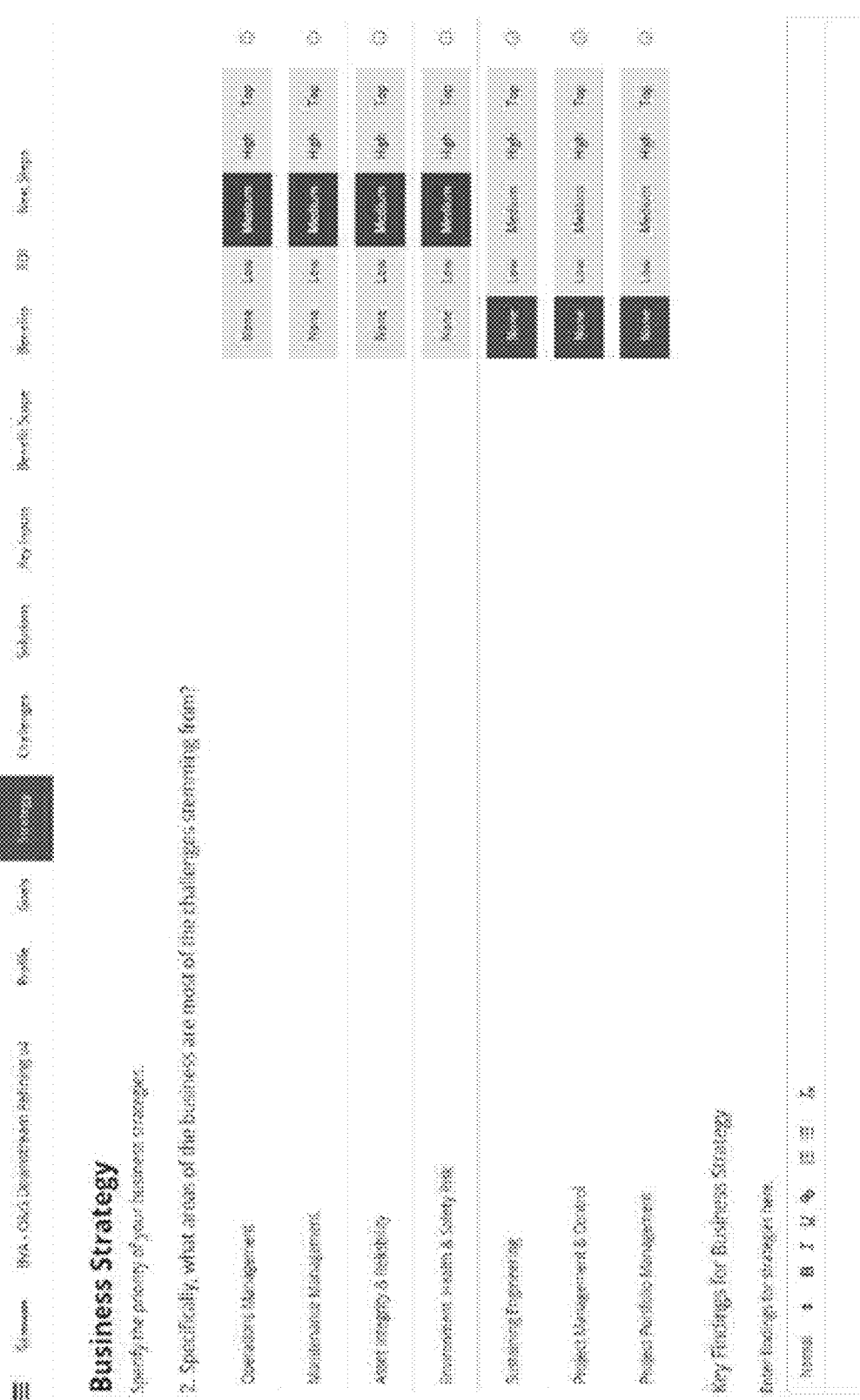
FIGS. 11-15 are schematic examples of a business value assessment.
Figure 12:
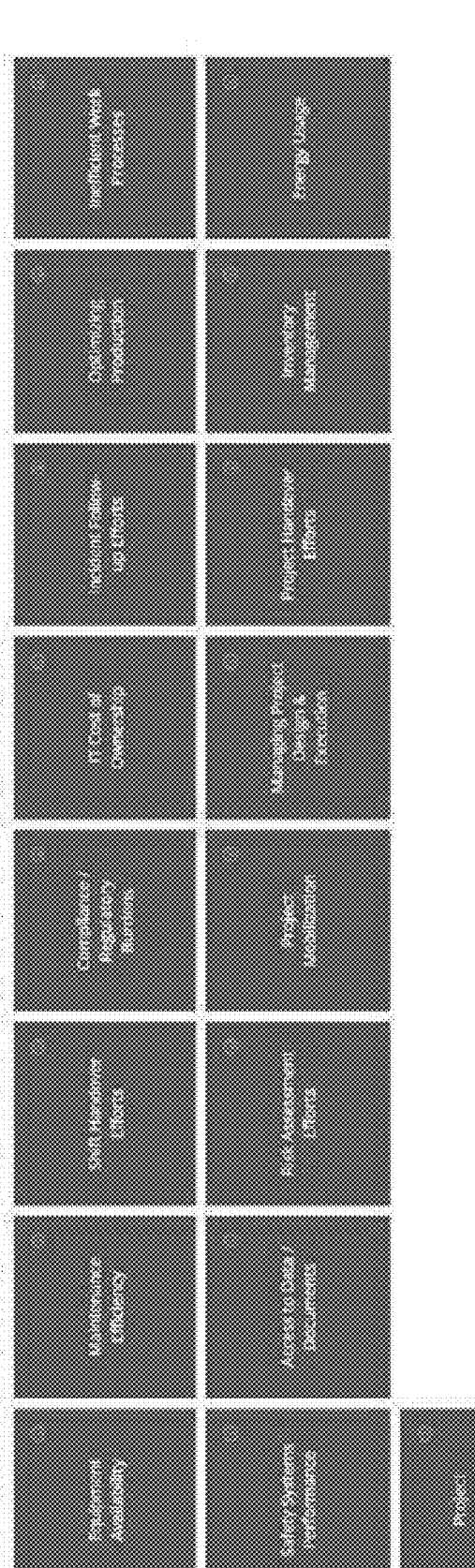
Figure 13:
Figure 14:
Figure 15:
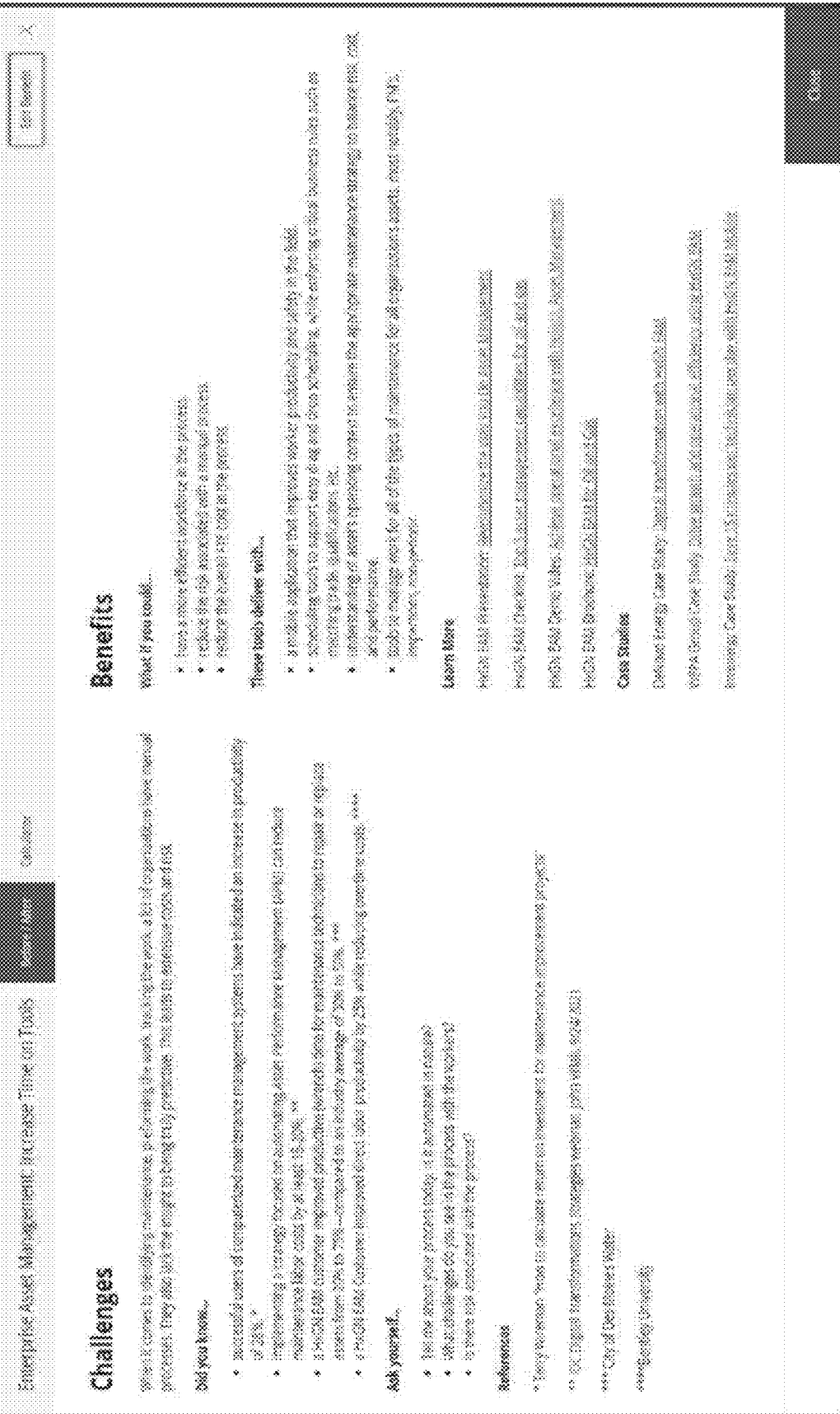

Updates to the map may be carried out with the prior noted MindManager product to create, edit and publish the map. Updates are typically carried out during the model building process. Ideas for changing or enhancing the mapping can also be submitted by any employee using our ideas platform Aha!. These ideas are tracked and reviewed by the value engineering stakeholders and implemented when approved. FIG. 8 schematically shows an example of a challenge map.

Solution Map

This map physically maps products within the consultant's platform from a business's corporate goals to the benefits of the solution the end-user chose during the completion of the business value assessment. This map lays out three primary questions to the end-user that narrows their focus to their specific corporate goals, business strategies, and challenges. The challenge, benefit and product relationship is pulled from the challenge map to end with the proper solution choices.

Consultants use this map to lay out and reference the proper sequencing of the BVA on the consultants platform during the model building process. This map may be easily accessible through a published URL and navigable using filters and tags that allow the noted internal consultant to narrow their focus to a product or group of products and their related benefits and challenges. It also provides filtering capabilities to zero in on specific end-user types and challenges. This all aids in building out the final template/model in the platform. FIG. 9 shows an example of a solution map.

Updates to the solution map are carried out by HxGN's Strategic Intelligence Solution Architects. We use a product called MindManager to create, edit and publish the map. Updates are typically carried out during the model building process. Ideas for changing or enhancing the mapping can also be submitted by any employee using our ideas platform called Aha! These ideas are tracked and reviewed by the end-user's value engineering stakeholders and implemented when approved.

Accordingly, unlike prior art solutions known to the inventors, illustrative embodiments can simplify a large complex portfolio of solutions across many different industry subsectors to democratize product assessment to the point where consultant's and end-users can have consistent value-oriented interactions while building robust and defensible business cases within hours rather than weeks.

Figure 16:
FIG. 16 is a schematic example of ROI Analysis.

FIG. 10, FIG. 11, FIG. 12, FIG. 13, FIG. 14 and FIG. 15 (collectively, FIGS. 10-15) show various examples of the business value assessment, which involve a questionnaire to some extent. This assessment is keyed off the various mind maps and, in fact, later questions can be omitted or added as a function of the answer to earlier questions. See FIG. 16 for an example of an ROI analysis.

As shown, some or all of these mind maps may be considered to form a hierarchical model that, in the examples shown, extends from highest level on the left, to the lowest level on the right. The model has nodes that are selectable to expand or reduce the data on shown (and may form a graphical user interface). Other embodiments use these mind maps to form customized mind maps for a given end-user (i.e., a customized model) reflecting the end-user's solution needs.

Illustrative embodiments apply to any of a variety of verticals or business types. Indeed, certain of those business types have specialized needs, such as those businesses that involve large scale capital projects. As an example, FIG. 17 generally shows one example of a large-scale capital project 10 (or more generally a "capital project 10") that may implement illustrative embodiments of the invention. More specifically, as known by those skilled in the art, a capital project 10 generally is a long-term investment made to build, augment, add, or improve on a highly capital intensive project—it requires notable amounts of both financial capital and labor capital to undertake, and often takes years to complete. Capital projects 10 are often defined by their large-scale cost relative to other investments requiring less planning and resources (e.g., building a house or a truck). Both the private sector and public sector can be involved in a capital project 10. Some examples of capital projects includes developing and maintaining roads, railways, power plants, ships, offshore oil platforms, dams, and factories.

Figure 17:
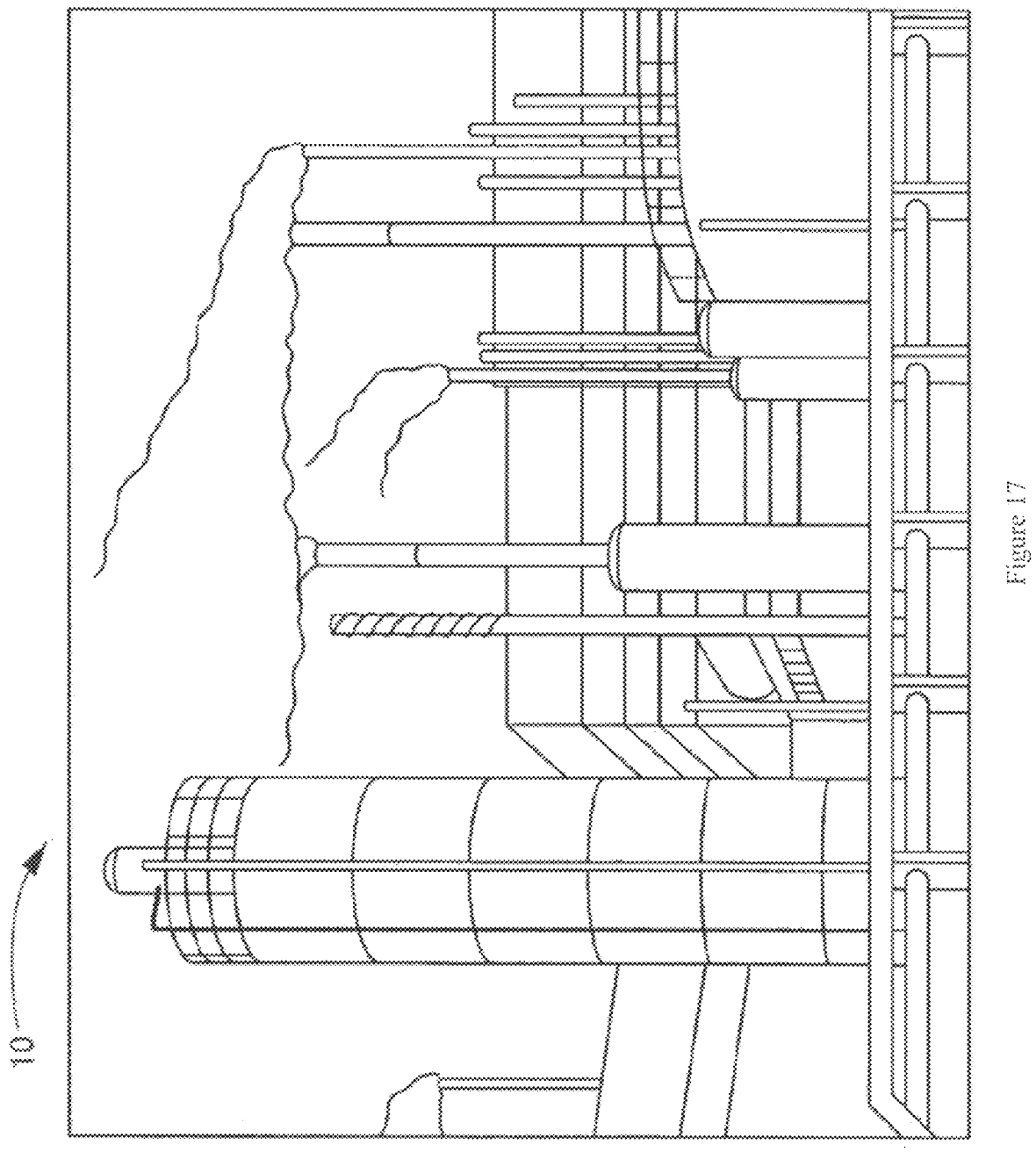
FIG. 17 schematically shows a large-scale capital project.

The capital project 10 shown in FIG. 17 is a power plant, which, as known by those skilled in the art, has an enormous number of different components that cooperate to accomplish its function of generating power. For example, among other things, the power plant of this figure has a plurality of large and small buildings, smokestacks, pipes, valves, fuel tanks, ladders, and electrical systems. Indeed, designing, building, maintaining, and decommissioning such a project requires vast amounts of planning and coordination. Without careful planning and coordination, the power plant may never have been built or operated.

To that end, those skilled in the art have developed 3D design programs/products ("3D design programs 12," FIG. 18, also known as "plant design programs") to assist in planning/designing, developing, maintaining, and decommissioning capital projects 10, such as that shown in FIG. 1. As noted above, one such widely used 3D design program 12 is known as the SmartPlant® Enterprise product (hereinafter "SmartPlant® product"), distributed by Intergraph, Inc. of Huntsville, Alabama. In a manner similar to other such products, the SmartPlant® product has at least the following interrelated functions and components:

3D modeling and visualization,
engineering and schematics,
information management,
procurement, fabrication, and construction,
open integration with other proprietary and open systems.

Accordingly, among other people, designers, engineers, developers, and managers use these and other features of 3D design programs 12, such as the SmartPlant® product, to design, update, manage, and decommission capital projects 10, such as the power plant shown in FIG. 17. During use, a 3D design program 12 generates many detailed 3D representations of components in the capital project 10. For example, a 3D design program 12 may generate detailed 3D renderings of pipe systems within the power plant of FIG. 17. To accomplish some function, a user may manipulate or modify the 3D renderings of specific components of the pipe system, such as valves and brackets. For example, a user may render a 3D representation of the noted pipe bracket on a display device, rotate it to determine or confirm certain properties, and modify certain of its attributes.

Figure 18:
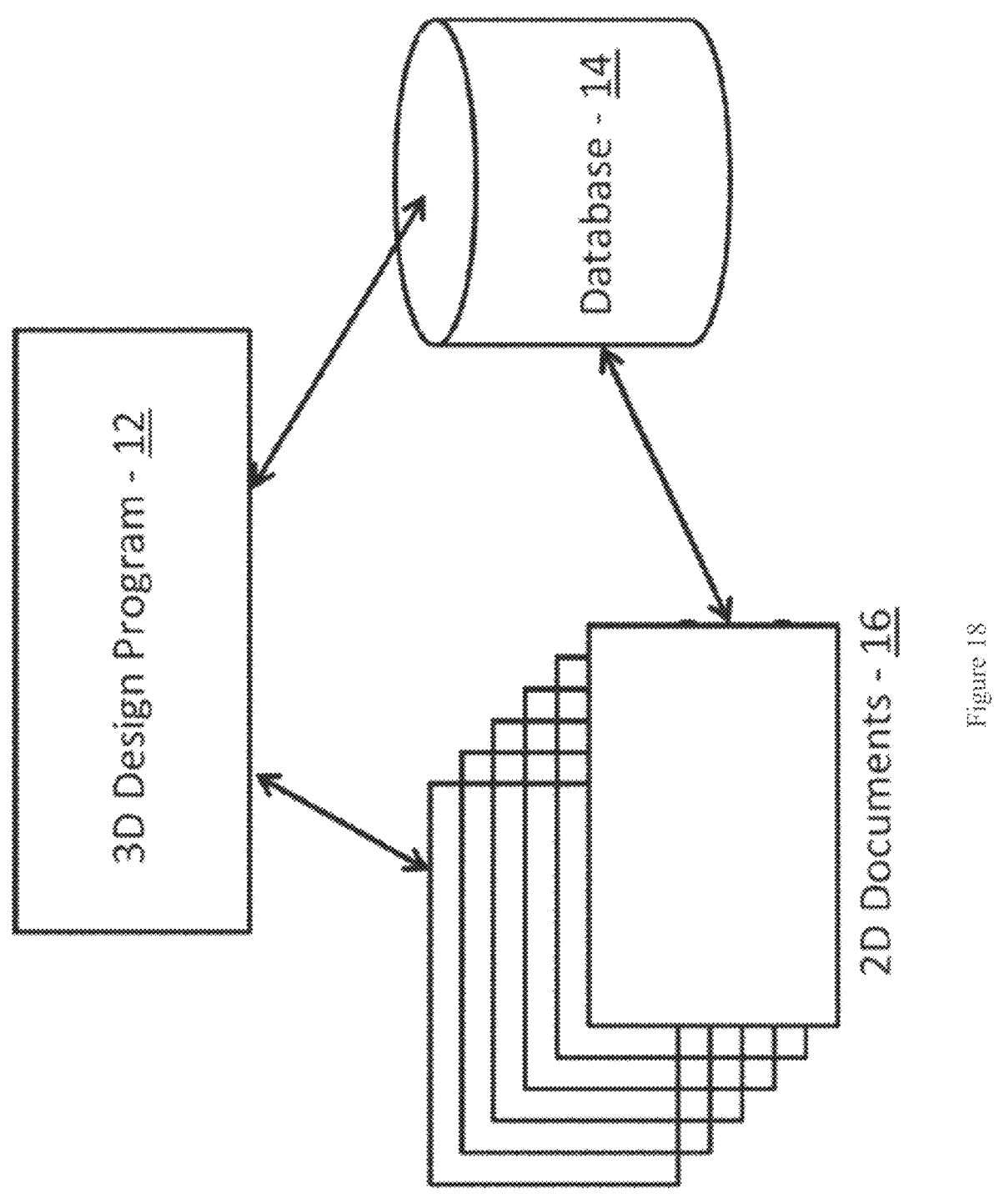
FIG. 18 schematically shows a high-level block diagram of a 3D design program.

FIG. 18 schematically shows a high-level block diagram of a 3D design program 12, such as the SmartPlant® product, and a database 14 (e.g., a model database) containing the attributes of the various components in the capital project 10 it manages. Specifically, the data relating to the various systems and components of the capital project 10 are stored in the database 14. For example, a pipe bracket of the power plant shown in FIG. 17 may have a number of various attributes, such as its shape, topology, geometry, dimensions, materials, etc. Each of those attributes is stored in the database 14 and, at any given time, may be considered to have a specific "state." In other words, the state of the component, such a pipe bracket, is defined by the attributes in this database 14 at a given time. Accordingly, a user and/or logic may access those attributes for any of a number of purposes, such as to produce a visual display of the bracket, or to modify the bracket. Thus, a user may modify the state of the component by modifying its attributes. As a part of a 3D design program 12, the database 14 has a complete 360 degree data set of information relating to many of these components and systems—e.g., so they can be rotated on a display device and managed in a plurality of orientations.

In accordance with one embodiment of the invention, an automated method and/or system provides a hierarchical data model with a plurality of solutions (e.g., a master map), provides a solutions database with information relating to the solutions and benefits of solutions for specific end-user, and generates a graphical user interface with a sequence of questions. Next, the method and/or system produces a report as a function of the answers, and asks the questions as a function of the answers, and/or end-user profile/type. The report is either automatically generated or generated in response to a user request. The method and/or system has the capability to provide (in the report or elsewhere) fewer than all the benefits a given solution provides based on end-user's profile and answers to the business value assessment.

Some embodiments are similar to the one immediately above, but focus to solutions related to a large scale industrial project (e.g., building a ship or power plant from planning, through construction, operation, and decommissioning—not necessary to include entire process but related). These embodiments also may produce a second data model (e.g., a end-user specific model) as a function of both the main/master data model and the answers from the questions derived from the business value assessment.

The above noted automated method and/or system for a large scale capital may use a hierarchical data model with nodes, and a graphical user interface with selectable fields. Each selectable field may have prescribed selectable items derived from the nodes in the data model. Preferably, the graphical user interface automatically displays a previously un-displayed question after receiving an answer to a currently displayed question.

In some embodiments, the method and/or system may produce a value representing the improvement to a large scale project if the user uses one of the recommended solutions. This generates a value by receiving input from the user into a process improvement model, and the graphical user interface also displays fields for receiving the user input to generate this value.

In accordance with other embodiments, a method and/or system focused on configuring a large scale project platform uses a hierarchical structure with first nodes relating to functions of the project. This method/system produces requirement nodes downstream of the first nodes, determines solutions (in some lower level) from a plurality of separate products and those solutions track back to the top level nodes, and. forms a hierarchical project data model with the other levels. In addition, this method/system displays the top level nodes with indicia to collapse or expand the lower level branches, and produces a report having one or more values representing the improvement in the large scale management platform from the solutions.

Illustrative embodiments may at least in part be implemented using a network. To that end, when executing, such embodiments may requesting access to a remote computer system across a wide area, packet based network that operates at least in part with a network layer protocol. This access request may be executed by sending a synchronize message and receiving an acknowledgement message to begin making a bi-directional virtual connection to the remote computer system. Then, a plurality of packets may be encrypted and forwarded toward the remote computer device to produce a secure encrypted connection.

Some embodiments related to a system for recommending solutions for a large-scale project. This system has a solutions database relating to the large scale project, and a rules engine that traverses a hierarchical tree of questions and uses answers and the nodes of the tree to traverse toward one or more solutions in the solutions database.

Features and/or aspects of the various embodiments described above may be combined.

Figure 19:
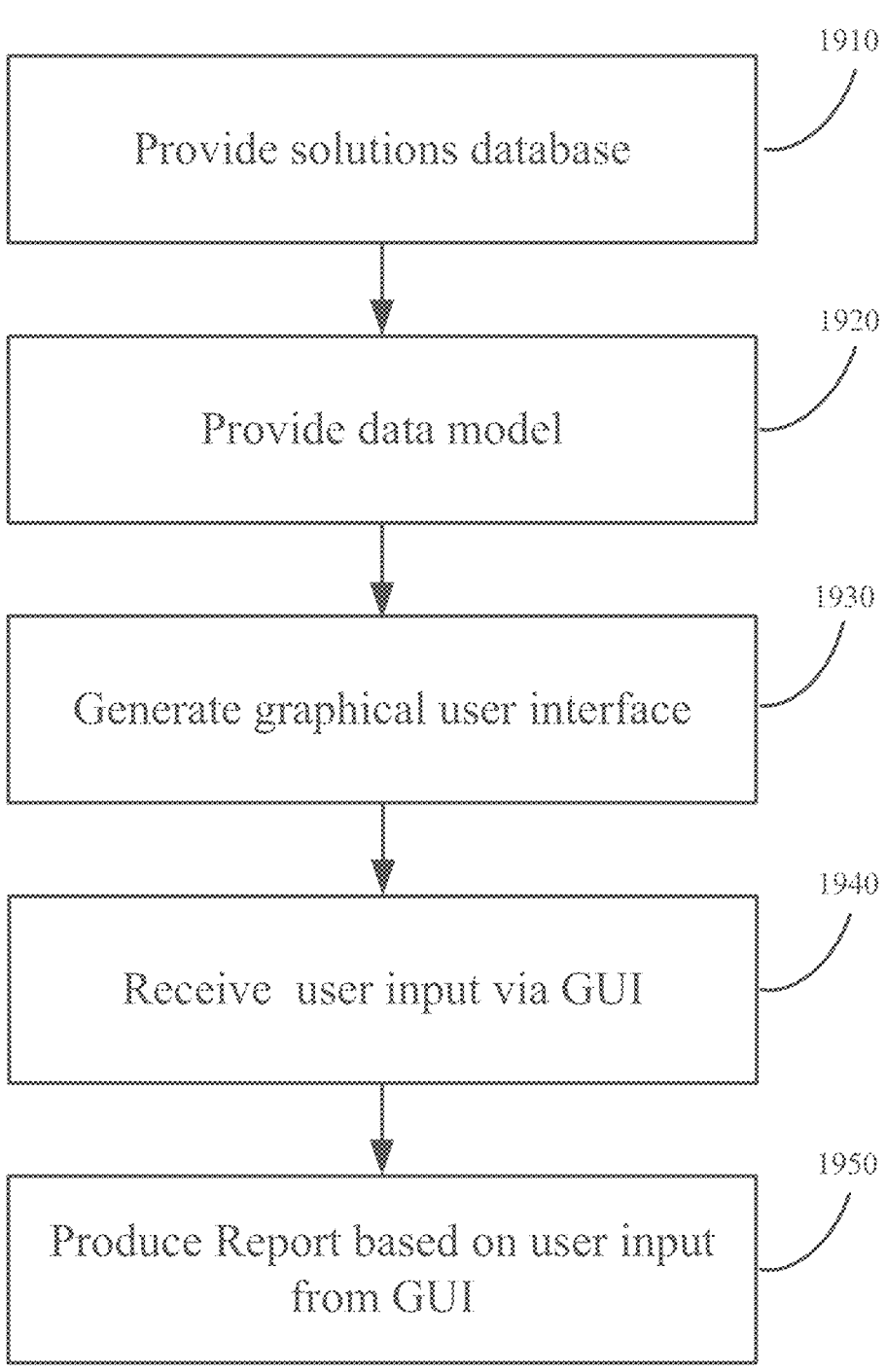
FIG. 19 is a flowchart of an embodiment of a method.

FIG. 19 is a flowchart of an embodiment of a method. Illustrative embodiments are implemented on a computer system, and may be referred-to as "computer-implemented" methods.

Step 1910 includes providing to the computer system a solutions database. Providing a solutions database may include adding the solutions database into a memory of the computer system, or making the solutions database available to the computer system, for example over a communications link from a remote database.

A solutions database defines or describes a plurality of distinct software-implemented solutions. For example, each distinct software-implemented solution may have associated functions or capabilities that may be described for that software-implemented solution in the solutions database.

In some embodiments, the solution database is indexed as a function of tools and solutions within the tools, each tool having tool information stored in the solution database, each tool having one or more solutions from a plurality of distinct software-implemented solutions.

Step 1920 includes providing, to the computer system, a data model, the model being configured in a hierarchical tree structure from more general nodes and ending with a plurality of specific solutions from the plurality of distinct software-implemented solutions. In illustrative embodiments, the data model is configured to cooperate with the solution database to facilitate changes to the hierarchical tree structure in response to user input. Providing a data model may include adding the data model into a memory of the computer system, or making the data model available to the computer system, for example over a communications link from a remote database.

The data model may include data specific to a corresponding industry, or to a specify type of project within a specific industry. For example, the power production industry may have concerns and challenges that are not relevant to the pharmaceutical production industry, which may concerns and challenges that are not relevant to the shipping industry.

Step 1930 includes generating, on a display device in communication with the computer system, a graphical user interface producing a dynamic sequence of questions as a function of both the data model and answers to questions received from a user of the computer system. Such answers may be referred-to as "user input."

In some embodiments, such a graphical user interface may be generated by populating a tree with information from the data model. In this way, the graphical user interface produced is customized to a corresponding industry, or a corresponding projects within a specific industry. The model may be stored in a memory or a remote database, and accessed by a computer system and used by the computer system to generate a customized graphical user interface.

In illustrative embodiments, each question is uniquely associated with a corresponding node from the plurality of nodes in the hierarchical tree structure, and the graphical user interface includes, for each question, a set of prescribed selectable fields with prescribed selectable indicia, the selectable indicia being derived from a node corresponding to said question.

The sequence of questions produced by the graphical user interface are configured to solicit from the user information about challenges relating to a project. For example, the project may be constructing or operating a large-scale industrial facility.

For example, the sequence of questions may include (1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question.

In illustrative embodiments, the sequence of questions asked by the graphical user interface is not static. Rather, the sequence of questions presented by the graphical user interface is dynamic in that one or more subsequent questions is determined based on the user's response to one or more previous questions.

In some embodiments, the graphical user interface automatically displays a previously un-displayed sequential subsequent question after receiving an answer to a displayed predecessor question.

In some embodiments, a collected set of answers to questions presented by the graphical user interface forms a vector defined by the answers to the sequence of questions.

Step 1940 includes generating, or causing an automated report builder to generate, an output report after receiving answers to the sequence of questions. The automated report builder is configured to produce the output report as a function of the answers, the output report including a set of specified solutions selected, based on the answers, from the solutions database. In other words, each such specified solution is selected from the plurality of distinct software-implemented solutions (e.g., of the solutions database) as a function of the answers. In some embodiments, causing an automated report builder to produce an output report comprises automatically causing the automated report builder to produce the report after completing the sequence of questions. In some embodiments, causing an automated report builder to produce an output report occurs in response to receipt by the computer of a request to produce the output report.

Automatically generating an output report may include assembling, as parts of the output report, a list of solutions identified through the use of the graphical user interface, and/or a list of software products that provide those solutions. In illustrative embodiments, the solutions database also includes a textual (e.g., in prose) description of an identified solution, or a software product that includes an identified solution, and/or a textual description of a benefit associated with each solution, and automatically generating an output report may include listing or adapting such descriptions along with its associated solution.

Some embodiments include providing a computer-implemented artificial intelligence (which may be referred-to as a "report artificial intelligence"), said artificial intelligence configured to: accept a vector defined by the answers to the sequence of questions (including, e.g., textual descriptions as described above); and to produce, from said vector, the output report that includes the set of specified solutions. In some embodiments, the computer-implemented artificial intelligence comprises a neural network trained with a training set having a plurality of training vectors, each training vector having: a set of training answers to a specified sequence of questions; and an associated set of specified solutions selected from the plurality of distinct software-implemented solutions. In some embodiments, the "report artificial intelligence" comprises a generative artificial intelligence configured to produce the output report in response to a prompt, the prompt comprising the vector defined by the answers to the sequence of questions.

Figure 20:
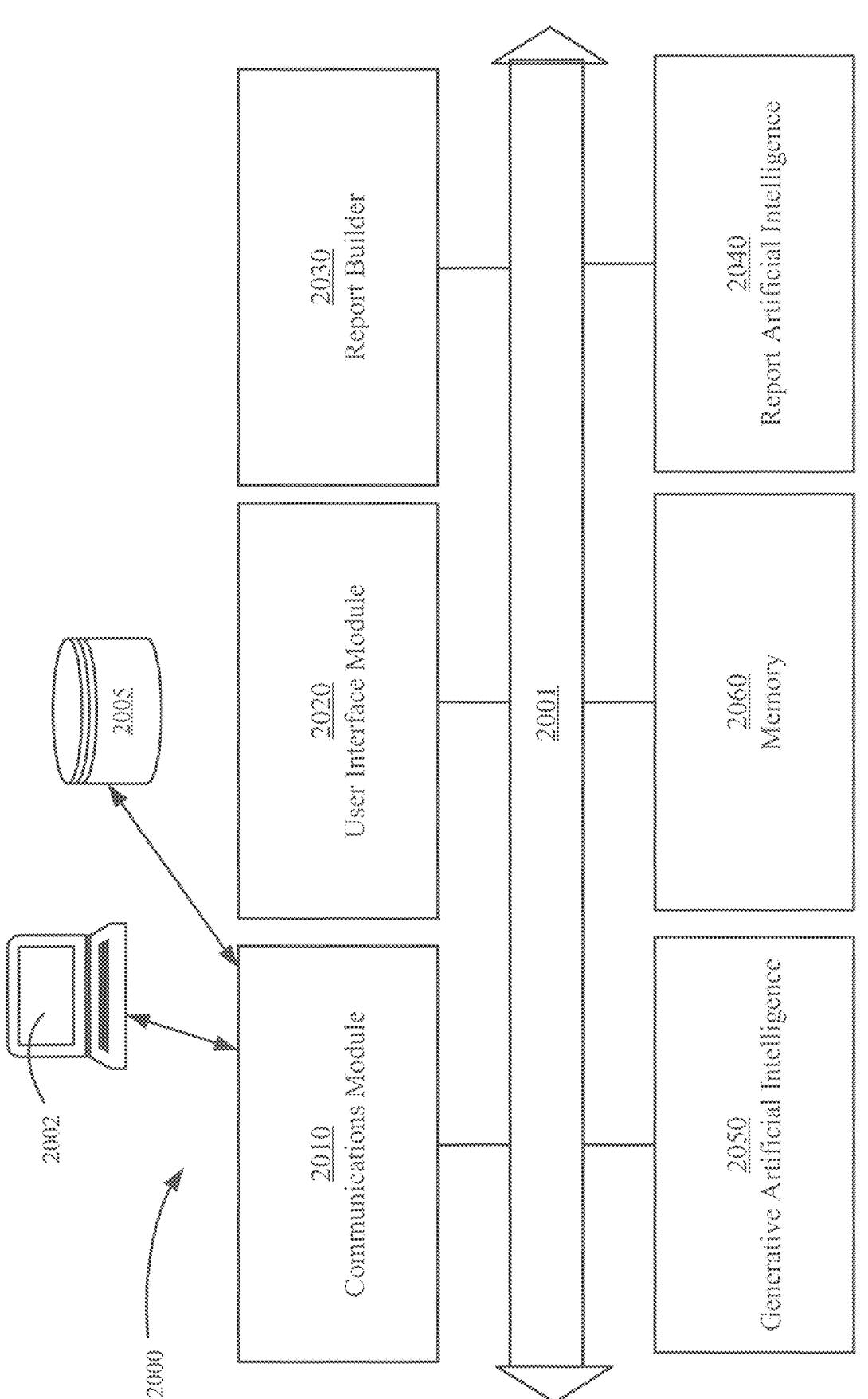
FIG. 20 schematically illustrates an embodiment of a system.

FIG. 20 schematically illustrates an embodiment of a system 2000 configured to implement embodiments of methods and processes described herein. In illustrative embodiments, the system 2000 includes a set of modules. Each module may be implemented in hardware (e.g., electrical circuits), or in software executing on a microprocessor, or by a combination of hardware and software. In some embodiments, two or more of such modules may be in data and/or control communication over a communications backbone 2001 (for example, a "bus").

The system 2000 includes a communications module 2010 that is configured to communicate with one or more remote computers 2002 or databases 2005. Such communication may occur over a network (e.g., a local area network; a wide area network; the Internet).

The system 2000 also includes a computer memory 2060 storing: a solutions database as described herein (e.g., defining or describing a plurality of distinct software-implemented solutions), and a data model as described herein. The data model is configured in a hierarchical tree structure from more general nodes and ending with a plurality of specific solutions from the plurality of distinct software-implemented solutions, and is configured to cooperate with the solution database to facilitate changes to the hierarchical tree structure in response to user input. In other embodiments, the solutions database and/or the data model may be stored remotely from the system 2000, for example in remote computer 2002 and/or database 2005.

The system 2000 also includes a user interface module 2020 configured to generate, on a computer display device, a graphical user interface producing a dynamic sequence of questions (e.g., as described above) as a function of both the data model and answers to questions received from the user (which may be referred-to as "user input), wherein the sequence of questions is configured to solicit from the user information about challenges relating to constructing or operating said large-scale industrial facility. In illustrative embodiments, the sequence of questions include (1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question.

The system 2000 also includes an automated report builder module 2030 configured to produce an output report after receiving answers to the sequence of questions. The automated report builder 2030 is configured to produce the output report as a function of the answers, and includes a set of specified solutions, each such specified solution selected from the plurality of distinct software-implemented solutions as a function of the answers.

Some embodiments of the system 2000 also include a report artificial intelligence 2040 configured (i.e., trained) to produce an output report (that includes the set of specified solutions) based on a suite vector defined by (e.g., consisting of) the user's answers to the sequence of questions.

Training a neural network to generate an output report from a vector, which output report includes a suggested set of solutions from a solutions database, may include (a) accessing a set of training datasets, each training dataset comprising a test vector, and having an associated set of solutions for each such test vector.

Training the neural network includes (b) creating a first training set comprising the set of training datasets, and (c) training the neural network in a first stage, using the first training set, to produce an output report. In illustrative embodiments, the first training set includes at least 5,000 such training datasets.

In some embodiments, training a neural network to produce an output report from a vector further includes (d) providing a second training set, the second training set comprising second training datasets, each of which has an associated incorrect output report; and (e) training the neural network in a second stage using the second training set, wherein said second stage improves the ability of the neural network to correctly produce an output report.

In some embodiments, the system 2000 also includes a generative artificial intelligence 2050 module configured to generate text and/or figures based on answers to the sequence of questions. Such a generative artificial intelligence 2050 may be considered to be part of the report builder 2030, or may be a separate module 2050.

In illustrative embodiments, the vector produced from the user's responses to the one or more graphical user interfaces described above (which may be referred-to as a "suite vector") includes information identifying each solution that meets one or more of a stakeholder's needs (or a software product that includes such a solution), along with a textual description (e.g., in prose) of each such solution or software product. That description may include a description of the functionality of the solution or software product, and may include a set of benefits provided by the solution.

A stakeholder may desire a written description of each solution, or a written description of a suite of solutions generated by one or more of the graphical user interfaces. Further, where the stakeholders are employed by or associated with an organization (e.g., a company), the stakeholder may desire that such a written description comply with the organization's style guide, where the organization's style guide is specific to that organization.

However, a simple compilation of a set of descriptions from the suite vector may undesirably fail to comply with the organization's particular style guide. A particular style guide for an origination may specify specific elements of writing style that, individually or collectively, are unique to that organization. For example, an organization's style guide may set standards that define the organization's branding, such as grammar use, logo usage, colors, visuals, fonts, word usage, and tone of writing, to name but a few examples.

Consequently, some embodiments include a generative artificial intelligence configured to generate a description of a suite of solutions from a suite vector, and specifically configured to generate a description of a suite of solutions which description complies with the organization's style guide. Such a generative artificial intelligence is primarily configured to generate content, where the substance of the content is provided by the suite vector, and the form of the content complies with the organization's style guide. In other words, such a generative artificial intelligence is primarily configured to recast input content (text and/or images) into generated content having a format that complies with the organization's style guide, and in some embodiments is exclusively configured to recast input content (text and/or images) into generated content having a format that complies with the organization's style guide, without generating new substantive content.

Such a generative artificial intelligence may be developed from scratch, such as by developing and training a large language model or, in preferred embodiments, by customizing a pre-existing generative artificial intelligence (such as ChatGPT for example) or large language model on which a pre-existing generative artificial intelligence is built (such as a large language model at the foundation of ChatGPT for example).

Inventors note that a pre-existing generative artificial intelligence and/or a pre-existing large language model inherently has a built-in style. For example, a pre-existing generative artificial intelligence may have inherently developed an associated style by virtue of the input material used in its training, or may have had an associated style intentionally impressed upon it by its training. For example, a pre-existing generative artificial intelligence may have a style defined by Strunk & White's *The Elements of Style*. However, such a style would not be a specific style as defined by an organization's style guide.

Building a large language model, or an entire generative artificial intelligence, from scratch requires a tremendous amount of time and effort, but is within the abilities of persons knowledgeable in the field of generative artificial intelligence. Customizing a pre-existing large language model, or a pre-existing generative artificial intelligence is likely to require less time and fewer resources, and is also within the abilities of persons knowledgeable in the field of generative artificial intelligence.

In illustrative embodiments, training a new (or bespoke) large language model or generative artificial intelligence, and customizing a pre-existing large language model or a pre-existing generative artificial intelligence includes collecting examples of content (text and/or figures) that comply with the organization's style guide, and creating a training set from those examples, and then training the large language model or generative artificial intelligence using that training set.

To create a new (or bespoke) large language model or generative artificial intelligence, the training set may include millions or billions of unique style-guide compliant examples. In contrast, to customize a pre-existing large language model or generative artificial intelligence, the training set my include as few as hundreds or thousands of unique style-guide compliant examples.

The large language model and/or generative artificial intelligence may be trained by proving the training set to a training model and causing the training model to train or customize the large language model and/or generative artificial intelligence. Such training is within the ability of people experienced in the art of generative artificial intelligence. Such training models may include generative adversarial networks ("GANs"), variational autoencoders ("VAEs), and diffusion models, to name but a few examples.

Consequently, a computer-implemented method of training an artificial intelligence to generate content that is compliant with an organization-specific style guide includes: (1) collecting a set of content examples in which each such content example complies with the organization-specific style guide; (2) creating a first training set comprising a plurality of the collected content examples; and (3) training the artificial intelligence using the first training set.

In some embodiments, training the artificial intelligence using the first training set includes providing the first training set to a generative adversarial network having a generator neural network and a discriminator neural network, wherein the first training set acts as a reference for the discriminator neural network, and operating the generative adversarial network to train the generator neural network to transform the generator neural network into a generative artificial intelligence configured to transform input content into output content having a format that complies with the organization-specific style guide.

In some embodiments, training the artificial intelligence using the first training set includes providing the first training set to a variational autoencoder.

In some embodiments, training the artificial intelligence using the first training set includes providing the first training set to a diffusion model.

Once the artificial intelligence is trained or customized, the artificial intelligence is configured to, and can be used to, accept input content (e.g., text and/or figures) in a format that is not compliant with the organization's style guide, and transform that input content into output content that is compliant with the organization's style guide.

Application scenarios include providing, to such a customized artificial intelligence, input content in a format that is not compliant with the organization's style guide (such as content that has been produced by one or more graphical user interfaces; e.g., a vector as described above), and causing the customized artificial intelligence to produce output content that is compliant with the organization's style guide by transforming the input content into output content that is compliant with the organization's style guide.

Various embodiments may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Without limitation, potential subject matter that may be claimed (prefaced with the letter "P" so as to avoid confusion with the actual claims presented below) includes:

P101: The computer-implemented method for providing an artificial intelligence trained to generate an output report comprising software solutions based on information from a user comprises:

producing said artificial intelligence by training a neural network by training a neural network by:

accessing a set of training datasets, each training dataset comprising a training vector and a corresponding set of software solutions;

creating a first training set comprising a plurality of training datasets from the set of datasets, and;

training the neural network in a first stage, using the first training set, to produce an output report comprising a list of software solutions selected from a plurality of available software solutions.

P102: The computer-implemented method of P101, wherein training a neural network further comprises:

providing a second training set, the second training set comprising a plurality of second training datasets; and training the neural network in a second stage using the second training set, wherein said second stage improves the ability of the neural network to correctly produce an output report.

P103: The computer-implemented method of any of P101-P102, wherein each training vector comprises answers to a plurality of questions, which answers are provided by a user and describe one or more of:

(a) the user's goals within a project being executed by the user; and (b) challenges faced by the user within said project being executed by the user.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transitory computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A computer-implemented method of managing a plurality of software solutions, each software solution useful for constructing or operating a large-scale industrial facility, the method comprising:

providing, to a computer, a solution database defining a plurality of distinct software-implemented solutions;

providing, to the computer, a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

generating, on a display device in communication with the computer, a graphical user interface producing a dynamic sequence of questions as a function of both the data model and answers to questions received from the user, said answers comprising user input, the sequence of questions configured to solicit from the user information about challenges relating to constructing or operating said large-scale industrial facility, the sequence of questions comprising:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question;

training an artificial intelligence to accept a vector defined by answers to the sequence of questions; and to produce, from said vector, and output report that includes the set of specified solutions, said artificial intelligence being an automated report builder, wherein said artificial intelligence comprises a neural network, and training said artificial intelligence comprises:

providing a first training set comprising a plurality of training datasets, each training dataset comprising a training vector comprising:

a set of training answers to a specified sequence of questions; and an associated set of specified solutions selected from the plurality of distinct software-implemented solutions;

training the neural network using the first training set in a first stage to produce an output report; and causing the automated report builder to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

2. The computer-implemented method of claim 1, wherein causing an automated report builder to produce an output report comprises automatically causing the automated report builder to produce the report after completing the sequence of questions.

3. The computer-implemented method of claim 1, wherein causing an automated report builder to produce an output report occurs in response to receipt by the computer of a request to produce the output report.

4. The computer-implemented method of claim 1, wherein the solution database is indexed as a function of tools and solutions within the tools, each tool having tool information stored in the solution database, each tool having one or more solutions from the plurality of distinct software-implemented solutions.

5. The computer-implemented method of claim 1, wherein:

each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

6. The computer-implemented method of claim 1, wherein the graphical user interface automatically displays previously un-displayed sequential subsequent question after receiving an answer to a displayed predecessor question.

7. The computer-implemented method of claim 1, the method further comprising:

providing a computer-implemented artificial intelligence, said artificial intelligence configured to:

accept a vector defined by the answers to the sequence of questions; and to produce, from said vector, the output report that includes the set of specified solutions.

8. The computer-implemented method of claim 1, wherein training said artificial intelligence further comprises:

providing a second training set, the second training set comprising second training datasets, each of which has an associated incorrect output report; and training the neural network in a second stage using the second training set.

9. The computer-implemented method of claim 1, wherein the artificial intelligence comprises a generative artificial intelligence configured to produce the output report that complies with a specific style guide of an organization, said specific style guide specifying specific elements of writing style that, individually or collectively, are unique to that organization, including one or more of grammar use, logo usage, colors, visuals, fonts, word usage, and tone of writing and training said generative artificial intelligence comprises:

(1) collecting a set of content examples in which each such content example complies with the specific style guide;

(2) creating a style training set comprising a plurality of the collected content examples; and (3) training the artificial intelligence using the style training set.

10. A computer-implemented system of managing a plurality of software solutions, each software solution useful for constructing or operating a large-scale industrial facility, the system comprising:

a computer memory storing:

a solution database defining a plurality of distinct software-implemented solutions, and a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

a user interface module configured to generate, on a computer display device, a graphical user interface producing a dynamic sequence of questions as a function of both the data model and answers to questions received from the user, said answers comprising user input, the sequence of questions configured to solicit from the user information about challenges relating to constructing or operating said large-scale industrial facility, the sequence of questions comprising:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question;

an artificial intelligence to accept a vector defined by answers to the sequence of questions; and to produce, from said vector, and output report that includes the set of specified solutions, said artificial intelligence being an automated report builder, wherein said artificial intelligence comprises a neural network trained by:

providing a first training set comprising a plurality of training datasets, each training dataset comprising a training vector comprising:

a set of training answers to a specified sequence of questions; and an associated set of specified solutions selected from the plurality of distinct software-implemented solutions;

training the neural network using the first training set in a first stage to produce an output report;

the automated report builder configured to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

11. The computer-implemented system of claim 10, wherein the solution database is indexed as a function of tools and solutions within the tools, each tool having tool information stored in the solution database, each tool having one or more solutions from the plurality of distinct software-implemented solutions.

12. The computer-implemented system of claim 10, wherein:

each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

13. The computer-implemented system of claim 10, wherein the graphical user interface automatically displays previously un-displayed sequential subsequent question after receiving an answer to a displayed predecessor question.

14. The computer-implemented system of claim 10, further comprising:

a computer-implemented artificial intelligence, said artificial intelligence configured to:

accept a vector defined by the answers to the sequence of questions; and to produce, from said vector, the output report that includes the set of specified solutions.

15. The computer-implemented system of claim 14, wherein the computer-implemented artificial intelligence comprises a neural network trained with a training set having a plurality of training vectors, each training vector having:

a set of training answers to a specified sequence of questions; and an associated set of specified solutions selected from the plurality of distinct software-implemented solutions.

16. A non-transitory computer-readable medium having computer executable code thereon, the computer executable code, when executed by a computer system, causing the computer system to perform a method, the method comprising:

providing, to the computer, a solution database defining a plurality of distinct software-implemented solutions;

providing, to the computer, a data model, the model being configured in a hierarchical tree structure from more general nodes and ending with a plurality of specific solutions from the plurality of distinct software-implemented solutions, the data model configured to cooperate with the solution database to facilitate changes to the hierarchical tree structure in response to user input;

generating, on a display device in communication with the computer, a graphical user interface producing a dynamic sequence of questions as a function of both the data model and answers to questions received from the user, said answers comprising user input, the sequence of questions configured to solicit from the user information about challenges relating to constructing or operating said large-scale industrial facility, the sequence of questions comprising:

(1) an initial question configured to solicit a first answer from the user; and (2) a plurality of sequential subsequent questions, each subsequent question associated with a node in the hierarchical tree structure, and each subsequent question following a predecessor question and determined by the user's answer to its predecessor question, the plurality of sequential subsequent questions ending with a final question;

training an artificial intelligence to accept a vector defined by answers to the sequence of questions; and to produce, from said vector, and output report that includes the set of specified solutions, said artificial intelligence being an automated report builder, wherein said artificial intelligence comprises a neural network, and training said artificial intelligence comprises:

providing a first training set comprising a plurality of training datasets, each training dataset comprising a training vector comprising:

a set of training answers to a specified sequence of questions; and an associated set of specified solutions selected from the plurality of distinct software-implemented solutions;

training the neural network using the first training set in a first stage to produce an output report;

causing the automated report builder to produce an output report after receiving answers to the sequence of questions, the automated report builder being configured to produce the output report as a function of the answers, the output report including a set of specified solutions, each such specified solution selected from the plurality of distinct software-implemented solutions as a function of the answers.

17. The non-transitory computer-readable medium of claim 16, wherein training said artificial intelligence further comprises:

providing a second training set, the second training set comprising second training datasets, each of which has an associated incorrect output report; and training the neural network in a second stage using the second training set.

18. The non-transitory computer-readable medium of claim 16, wherein:

each question is uniquely associated with a corresponding node from the plurality of nodes in the hierarchical tree structure; and the graphical user interface includes, for each question, a set of prescribed selectable fields with prescribed selectable indicia, the selectable indicia being derived from a node corresponding to said question.

19. The non-transitory computer-readable medium of claim 16, wherein the artificial intelligence comprises a generative artificial intelligence configured to produce the output report, which output report complies with a specific style guide of an organization, said specific style guide specifying specific elements of writing style that, individually or collectively, are unique to that organization, including one or more of grammar use, logo usage, colors, visuals, fonts, word usage, and tone of writing and training said generative artificial intelligence comprises:

(1) collecting a set of content examples in which each such content example complies with the specific style guide;

(2) creating a style training set comprising a plurality of the collected content examples; and (3) training the artificial intelligence using the style training set.

20. The non-transitory computer-readable medium of claim 16, wherein the method further comprises providing a computer-implemented artificial intelligence, said artificial intelligence configured to:

accept a vector defined by the answers to the sequence of questions; and to produce, from said vector, the output report that includes the set of specified solutions.

* * * * *